United States Patent
Razavi Majomard et al.

(10) Patent No.: US 12,341,570 B2
(45) Date of Patent: Jun. 24, 2025

(54) NETWORK USING ASYMMETRIC UPLINK AND DOWNLINK BAUD RATES TO REDUCE CROSSTALK

(71) Applicant: Marvell Asia Pte Ltd, Singapore (SG)

(72) Inventors: Seid Alireza Razavi Majomard, Belmont, CA (US); Ragnar Hylnur Jonsson, Aliso Viejo, CA (US); David Shen, Saratoga, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 18/614,329

(22) Filed: Mar. 22, 2024

(65) Prior Publication Data

US 2024/0235611 A1    Jul. 11, 2024

Related U.S. Application Data

(63) Continuation of application No. 17/549,744, filed on Dec. 13, 2021, now Pat. No. 11,943,005.

(60) Provisional application No. 63/124,510, filed on Dec. 11, 2020.

(51) Int. Cl.
    H04B 3/32   (2006.01)
    H04B 3/21   (2006.01)

(52) U.S. Cl.
    CPC ............... H04B 3/32 (2013.01); H04B 3/21 (2013.01)

(58) Field of Classification Search
    CPC ................................. H04B 3/32; H04B 3/21
    See application file for complete search history.

(56) References Cited

U.S. PATENT DOCUMENTS

| | | | |
|---|---|---|---|
| 6,101,172 A * | 8/2000 | van Bavel | H04L 5/143 370/480 |
| 6,246,716 B1 | 6/2001 | Schneider | |
| 8,179,910 B2 * | 5/2012 | Diab | H04N 21/43615 398/71 |
| 9,001,872 B1 | 4/2015 | Farjadrad et al. | |
| 9,893,756 B1 | 2/2018 | Sedarat et al. | |
| 10,069,521 B1 | 9/2018 | Farjadrad et al. | |
| 10,999,124 B1 | 5/2021 | Sedarat et al. | |
| 11,228,340 B1 | 1/2022 | Lim et al. | |
| 11,943,005 B2 | 3/2024 | Razavi Majomard et al. | |
| 2004/0247022 A1 * | 12/2004 | Raghavan | H04B 3/32 375/219 |

(Continued)

OTHER PUBLICATIONS

Barrass et al., "10GBASE-T: 10 Gigabit Ethernet over Twisted-pair Copper," v. 1.0, Ethernet Alliance, 44 pages (Aug. 2007).

(Continued)

*Primary Examiner* — Steven Hieu D Nguyen

(57) ABSTRACT

A transmitter transmits a first signal via a first cable at a first baud rate. A receiver receives a second signal via the first cable concurrently with transmitting the first signal via the first cable. The second signal is transmitted by another device at a second baud rate that is lower than both i) the first baud rate and ii) a third baud rate at which a third signal is being transmitted in a second cable that causes crosstalk in the second signal being received via the first cable. Reception of the second signal at the second baud rate that is lower than the third baud rate facilitates mitigation of the crosstalk in the second signal caused by transmission of the third signal in the second cable at the third baud rate.

20 Claims, 7 Drawing Sheets

(56) References Cited

U.S. PATENT DOCUMENTS

| | | | |
|---|---|---|---|
| 2005/0099967 A1* | 5/2005 | Baba | H04B 3/32 |
| | | | 370/286 |
| 2005/0213693 A1* | 9/2005 | Page | H04L 9/40 |
| | | | 375/354 |
| 2012/0327818 A1 | 12/2012 | Takatori | |
| 2015/0256221 A1 | 9/2015 | Rao et al. | |
| 2016/0211939 A1* | 7/2016 | Yu | H04B 10/5561 |
| 2020/0295911 A1 | 9/2020 | Wu et al. | |

OTHER PUBLICATIONS

International Search Report and Written Opinion for PCT/US2021/063155, mailed Mar. 25, 2022.
Jones, "10GBASE-T Tutorial Overview," Institute for Electrical and Electronics Engineers, 34 pages, available at https://www.ieee802.org/3/1OGBT/public/Jan. 03/jones_2_0103.pdf (Jan. 2003).
Muller et al., "IEEE 802 10GBASE-T Tutorial Overview," Institute for Electrical and Electronics Engineers, 56 pages, available at https://www.ieee802.org/3/1 0GBT/public/nov03/1 0GBASETtutorial.pdf (Nov. 2003).
Unberboeck, "10GBASE-T: 10Gbits/s Ethernet over copper," Broadcom, 23 pages, available at https://www.southampton.ac.uk/~sqc/EL336/1 0GBASE-T.pdf (Sep. 2006).
"How Much Does Office Building Wiring Cost?" CostOwl.com, available at https://www.costowl.com/b2b/cabling-wiring/cabling-wiring-office-building-cost/#network-cabling-considerations, last updated Dec. 8, 2021 (2 pages).

* cited by examiner

NETWORK USING ASYMMETRIC UPLINK AND DOWNLINK BAUD RATES TO REDUCE CROSSTALK

CROSS REFERENCES TO RELATED APPLICATIONS

The present application is a continuation of Ser. No. 17/549,744, filed on Dec. 13, 2021, entitled "Network Using Asymmetric Uplink and Downlink Baud Rates to Reduce Crosstalk," which claims the benefit of U.S. Provisional Patent Application No. 63/124,510, entitled "Asymmetric Enterprise Network," filed on Dec. 11, 2020. All of the applications referenced above are hereby incorporated by reference in their entireties.

FIELD OF TECHNOLOGY

The present disclosure relates generally to communication networks, and more particularly to Ethernet communications via twisted pair cables.

BACKGROUND

One gigabit per second (1G) and slower Ethernet networks have proliferated in office buildings, schools, residential housing, etc., over the past two decades. 1G and slower Ethernet networks often employ Category 5 (Cat5) or Category 5e (Cat5e) twisted pair copper cables, comprising multiple twisted wire pairs. As a result, there is currently a large installed base 1G and slower Ethernet networks using Cat5 and Cat5e cables.

The Institute for Electrical and Electronics Engineers (IEEE) published several standards for Ethernet networks that utilize 10 gigabit per second (10G) communications over optical and copper cabling in the early to mid-2000s. For example, the IEEE 802.3ae Standard (2002) defines a communication protocol for 10G Ethernet over optical fiber, and the IEEE 802.3ak Standard (2004) defines a communication protocol for 10G Ethernet over twin-axial cable. The IEEE 802.3an Standard (2006) defines a communication protocol for 10G Ethernet over copper twisted pair cable.

The higher baud rate of 10G Ethernet as compared to 1G and slower Ethernet tends to cause more crosstalk between twisted pair copper cables. Cat5 and Cat5e cables generally are not rated for use with 10G Ethernet, mainly due to reduced performance caused by increased crosstalk between cables at the higher baud rate of 10G Ethernet. For example, Cat5 and Cat5e cables are rated up to 100 MHz, whereas 10G Ethernet over copper twisted pair cable (the IEEE 802.3an Standard) utilizes a baud rate of 800 Megasymbols per second (MSps). The minimum bandwidth required for a given baud rate is at least twice the baud rate. Thus, for 10G Ethernet, the minimum bandwidth required is 400 MHz. As discussed above, however, Cat5 and Cat5e are rated up to only 100 MHz.

On the other hand, Category 6 (Cat6) and Category 6A (Cat6A) cables are designed for higher baud rates (and they mitigate crosstalk at the higher baud rates) and are rated for up to 250 MHz and 500 MHz, respectively. Thus, it is common for 10G Ethernet network deployments to use Cat6 or Cat6A (or even Category 7 (Cat7)) cables.

Partly as a result of the high cost of replacing the large existing installed base of Cat5 and Cat5e cables with Cat6 or Cat6A (or even Cat7) cables, there is currently a relatively small number of 10G Ethernet networks in office buildings, schools, residential housing, etc.

SUMMARY

In an embodiment, a first network device for communicating via a first cable comprises: a first transmitter configured to transmit a first signal via the first cable at a first baud rate that corresponds to a first minimum required bandwidth, the first minimum required bandwidth exceeding a maximum bandwidth rating of the first cable; and a first receiver configured to receive a second signal via the first cable concurrently with transmitting the first signal via the first cable, the second signal having been transmitted by a second network device at a second baud rate that is lower than both i) the first baud rate and ii) a third baud rate at which a third signal is being transmitted in a second cable that causes crosstalk in the second signal being received via the first cable, wherein the second baud rate corresponds to a second minimum required bandwidth that is no more than the maximum bandwidth rating of the first cable, wherein the third baud rate corresponds to a third minimum required bandwidth that exceeds a maximum bandwidth rating of the second cable, and wherein reception of the second signal at the second baud rate that is i) lower than the third baud rate, and ii) is no more than the maximum bandwidth rating of the first cable, facilitates mitigation of the crosstalk in the second signal caused by transmission of the third signal in the second cable at the third baud rate.

In another embodiment, a method for communicating via a first cable includes: transmitting, by a first transceiver of a first network device, a first signal via the first cable at a first baud rate that corresponds to a first minimum required bandwidth, the first minimum required bandwidth exceeding a maximum bandwidth rating of the first cable; concurrently with transmitting the first signal via the first cable, receiving, by the first transceiver, a second signal via the first cable, the second signal having been transmitted by a second network device at a second baud rate that is lower than both i) the first baud rate and ii) a third baud rate at which a third signal is being transmitted in a second cable that causes crosstalk in the second signal being received via the first cable, wherein the second baud rate corresponds to a second minimum required bandwidth that is no more than the maximum bandwidth rating of the first cable, wherein the third baud rate corresponds to a third minimum required bandwidth that exceeds a maximum bandwidth rating of the second cable, and wherein reception of the second signal at the second baud rate that is i) lower than the third baud rate, and ii) is no more than the maximum bandwidth rating of the first cable, facilitates mitigation of the crosstalk in the second signal caused by transmission of the third signal in the second cable at the third baud rate.

In yet another embodiment, a first network interface for communicating via a first cable comprises: a receiver configured to receive a first signal via the first cable, the first signal having been transmitted by a second network device at a first baud rate; and a transmitter configured to transmit, concurrently with the receiver receiving the first signal at the first baud rate, a second signal via the first cable at a second baud rate that is lower than the first baud rate to reduce crosstalk, caused by transmission of the second signal in the first cable, into one or more second cables.

In still another embodiment, a method for communicating via a first cable includes: receiving, at a transceiver of a first network device, a first signal via the first cable, the first signal having been transmitted by a second network device at a first baud rate; and concurrently with receiving the first signal via the first cable, transmitting, by the transceiver, a second signal via the first cable at a second baud rate that is lower than the first baud rate to reduce crosstalk, caused by transmission of the second signal in the first cable, into one or more second cables.

DETAILED DESCRIPTION

As mentioned above, there is currently a large installed base 1G and slower Ethernet networks using Cat5 and Cat5e cables. However, both the need for higher data speeds and the availability of 10 gigabit per second (10G) Ethernet ports have increased significantly in recent years. Thus, the desire to upgrade existing 1 gigabit per second (1G) and slower Ethernet networks is growing. One obstacle to upgrading existing 1G and slower Ethernet networks, however, is the cost of upgrading the cabling required for 10G Ethernet. Cat6 and Cat6a cables are more expensive than Cat5 and Cat5e cables. More importantly, the cost of labor to replace Cat5 and Cat5e cables with Cat6 or Cat6a cables is significant, and the process of cable replacement likely will be very disruptive to users of an Ethernet network, workers of an office building, residents of an apartment building, etc., for example.

In many existing Ethernet networks, the amount of data travelling in a first direction (e.g., from a router, switch, hub, etc., to an endpoint) is significantly greater than the amount of data travelling in a second direction (e.g., from the endpoint to the router, switch, hub, etc.). Thus, the need for high-speed data in the first direction is greater than in the second direction in many Ethernet networks. The present application describes embodiments of devices and methods that allow for higher speed transmission in a first direction (e.g., 10 gigabits per second (Gbps)) using existing cables (such as Cat5 and Cat5e cables, or even Cat3 cables) that are not rated for the higher speed; the higher speed transmission in the first direction over existing cables is facilitated, at least in part, by transmission in a second direction at a lower speed (e.g., 0.1 Gbps, 1 Gps, 2.5 Gps, 5 Gps). As is described further below, the use of asymmetric transmission rates mitigates adverse effects of crosstalk between cables (e.g., Cat5 and Cat5e cables). Thus, higher speed transmission in the first direction can be achieved with existing, already installed cables (e.g., Cat5 and Cat5e cables, or even Cat3 cables), i.e., without having to install new cabling.

Figure 1:
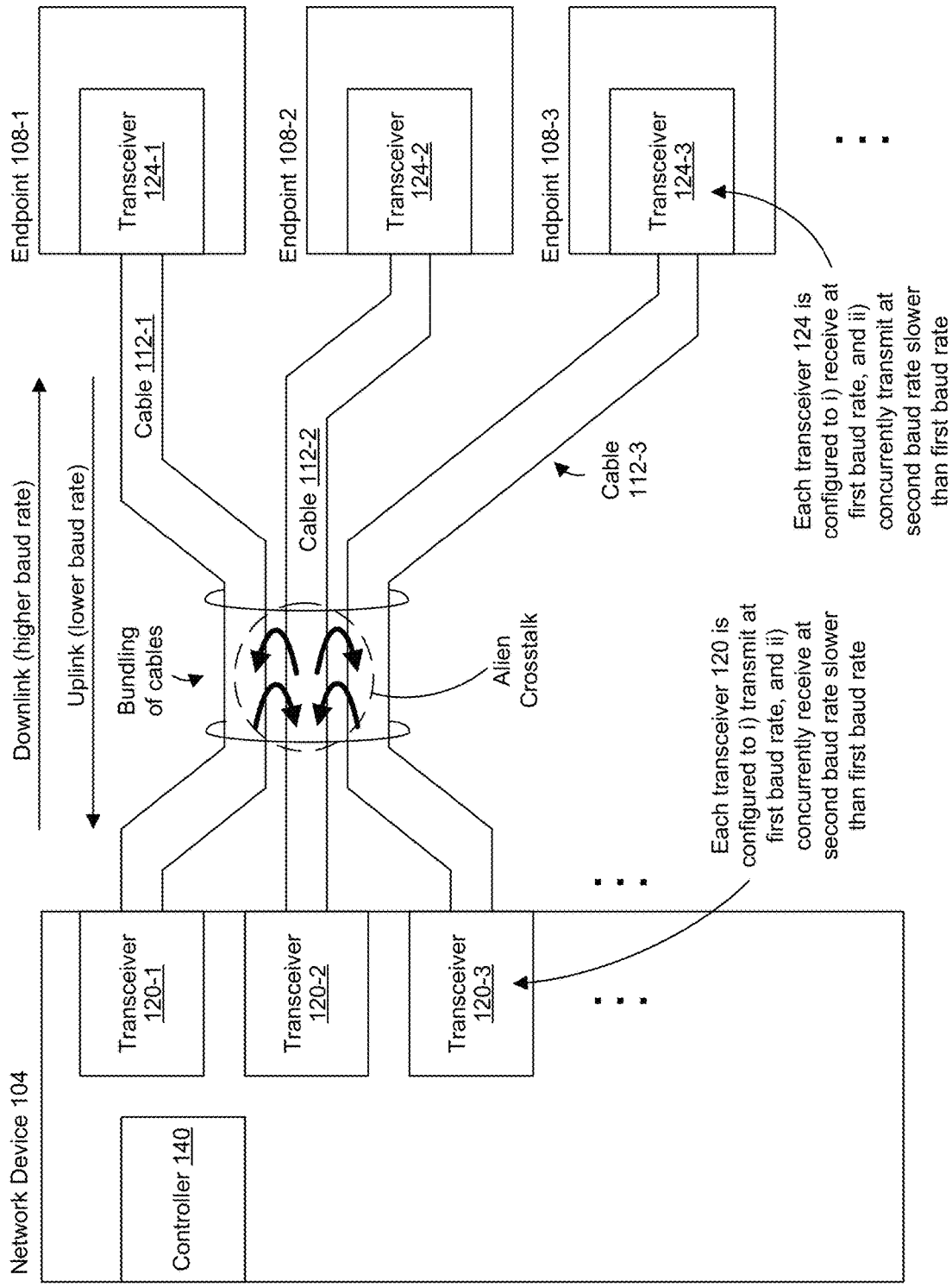
FIG. 1 is a simplified diagram of an example communication system that uses asymmetric uplink and downlink transmission rates to reduce crosstalk between cables, according to an embodiment.

FIG. 1 is a simplified diagram of an example communication system 100, according to an embodiment. The communication system 100 includes a network device 104, such as a router, a switch, a hub, etc., communicatively coupled to a plurality of endpoint devices 108 (e.g., computers, televisions, gaming systems, medical equipment, etc.) via respective cables 112. As an illustrative example, the communication system 100 is located in an office building, and the endpoint devices 108 correspond to computers in different workstations (e.g., offices, cubicles, etc.). As another illustrative example, the communication system 100 is located in a multi-family residential building, and the endpoint devices 108 correspond to computers, televisions, gaming systems, etc., throughout the residential building. As another illustrative example, the communication system 100 is located in a healthcare facility, and the endpoint devices 108 correspond to medical equipment, computers, televisions, throughout the healthcare facility.

The network device 104 include a plurality of transceivers 120, each communicatively coupled to a respective cable 112. Similarly, each endpoint 108 includes a respective transceiver 124 communicatively coupled to a respective cable 112. Although three transceivers 120 and three endpoints 108 are illustrated in FIG. 1, the communication system 100 includes other suitable numbers of transceivers 120 and endpoints 108, such as two or more than 3. In some embodiments, a single endpoint 108 includes multiple transceivers 124 communicatively coupled to multiple respective cables 112.

One or more of the cables 112 are Class C cables (sometimes referred to as a Category 3 (Cat3) cable) or Class D cables (sometimes referred to as a Category 5e (Cat5e) cable) as specified by the ISO/IEC 11801 standard, according to an embodiment. A Class C (Cat3) cable comprises a plurality of twisted copper wire pairs and is typically rated for certain performance and test requirements up to 16 MHz. A Class D (Cat5e) cable comprises a plurality of twisted copper wire pairs and is typically rated for certain performance and test requirements up to 100 MHz. One or more of the cables 112 are Category 5 (Cat5) cables specified by an older version of the ISO/IEC 11801 standard and, like Cat5e cables, are rated for certain performance and test requirements up to 100 MHz (according to the older version of the ISO/IEC 11801 standard). Category 3 cables, Category 5 cables, and Category 5E cables are sometimes referred to herein as "legacy cables."

In comparison, Class E cables (sometimes referred to as Category 6 (Cat6) cables) as specified by the ISO/IEC 11801 standard and Class $E_A$ cables (sometimes referred to as Category 6A (Cat6A) cables) as specified by the ISO/IEC 11801 standard are rated for certain performance and test requirements up to 250 MHz and 500 MHz, respectively. Class F cables (sometimes referred to as Category 7 (Cat7) cables) as specified by the ISO/IEC 11801 standard are rated for certain performance and test requirements up to 600 MHz. On the other hand, a legacy cable may not be rated for any performance or test requirements above 100 MHz according to the ISO/IEC 11801 standard, according to some embodiments.

In some embodiments, one or more other cables 112 are legacy cables that are not rated for any performance or test requirements above 100 MHz. In some embodiments, one or more other cables 112 are rated for performance or test requirements above 100 MHz. For example, one or more other cables 112 are Cat6, Cat6a, or Cat7 cables, according to an embodiment.

As will be described in more detail below, at least some of the transceivers 120 (e.g., at least the transceivers 120-1, 120-2, and 120-3) are configured to transmit at a first baud rate while concurrently receiving at a second baud rate that is lower than the first baud rate. Similarly, at least some of the transceivers 124 (e.g., at least the transceivers 124-1, 124-2, and 124-3) are configured to receive at the first baud rate while concurrently transmitting at the second baud rate.

As illustrated in FIG. 1, at least cables 112-1, 112-2, and 112-3 are bundled together for cable management. The bundling of cables 112-1, 112-2, and 112-3 generally increases crosstalk between the cables 112-1, 112-2, and 112-3. For example, transmissions within cable 112-1 and transmissions within cable 112-3 both cause crosstalk into cable 112-2. Similarly, transmissions within cable 112-2 cause crosstalk into cable 112-1 and cable 112-3. Such crosstalk is sometimes referred to as "alien crosstalk" because the crosstalk experienced by one cable 112 is caused by transmissions in another cable 112, as opposed to crosstalk between different twisted wire pairs within a single cable 112.

In other embodiments, at least some cables 112 (e.g., at least cables 112-1, 112-2, and 112-3) are not bundled, but are otherwise deployed in an arrangement that results in alien crosstalk between cables 112. For example, cables 112 that run together in close proximity (while not being bundled with a strap or tie) for a span may experience alien crosstalk. In other embodiments, at least some alien crosstalk occurs because of close proximity between ports of the network device to which respective cables 112 are connected, as opposed to bundling of cables 112 or close proximity of cables 112.

Generally, legacy cables tend to cause and/or experience more alien crosstalk with 10G Ethernet transmissions as compared to Cat6, Cat6A, and Cat7 cables.

The largest component of alien crosstalk typically is crosstalk experienced by receive circuitry within a first transceiver (e.g., a transceiver 120 or a transceiver 124) caused by transmissions by one or more second transceivers that are located proximate to the first transceiver, sometimes referred to as "near-end alien crosstalk." For example, receive circuitry of the transceiver 120-1 experiences near-end alien crosstalk caused by transmissions by the transceiver 120-2 within the cable 112-2. As another example, receive circuitry of the transceiver 120-2 experiences near-end alien crosstalk caused by transmissions by the transceiver 120-1 within the cable 112-1 and by transmissions by the transceiver 120-3 within the cable 112-3. As another example, receive circuitry of the transceiver 120-3 experiences near-end alien crosstalk caused by the transmissions by the transceiver 120-2 within the cable 112-2.

Other examples of alien crosstalk include: receive circuitry of the transceiver 124-1 experiences near-end alien crosstalk caused by transmissions by the transceiver 124-2 within the cable 112-2; receive circuitry of the transceiver 124-2 experiences near-end alien crosstalk caused by transmissions by the transceiver 124-1 within the cable 112-1 and by transmissions by the transceiver 124-3 within the cable 112-3; and receive circuitry of the transceiver 124-3 experiences near-end alien crosstalk caused by the transmissions by the transceiver 124-2 within the cable 112-2.

A Cat5e cable (or even a Cat5 cable) can be used for a 10G Ethernet link when the length of the cable is relatively short and when alien crosstalk is not an issue, such as when the cable is not bundled with any other Ethernet cables. However, in a network such as illustrated in FIG. 1 in which multiple network cables 112 are bundled, or in deployments in which alien crosstalk is otherwise significant, standard 10G Ethernet transmissions over Cat5e or Cat5 cables will typically result in alien crosstalk that significantly degrades performance.

Figure 2:
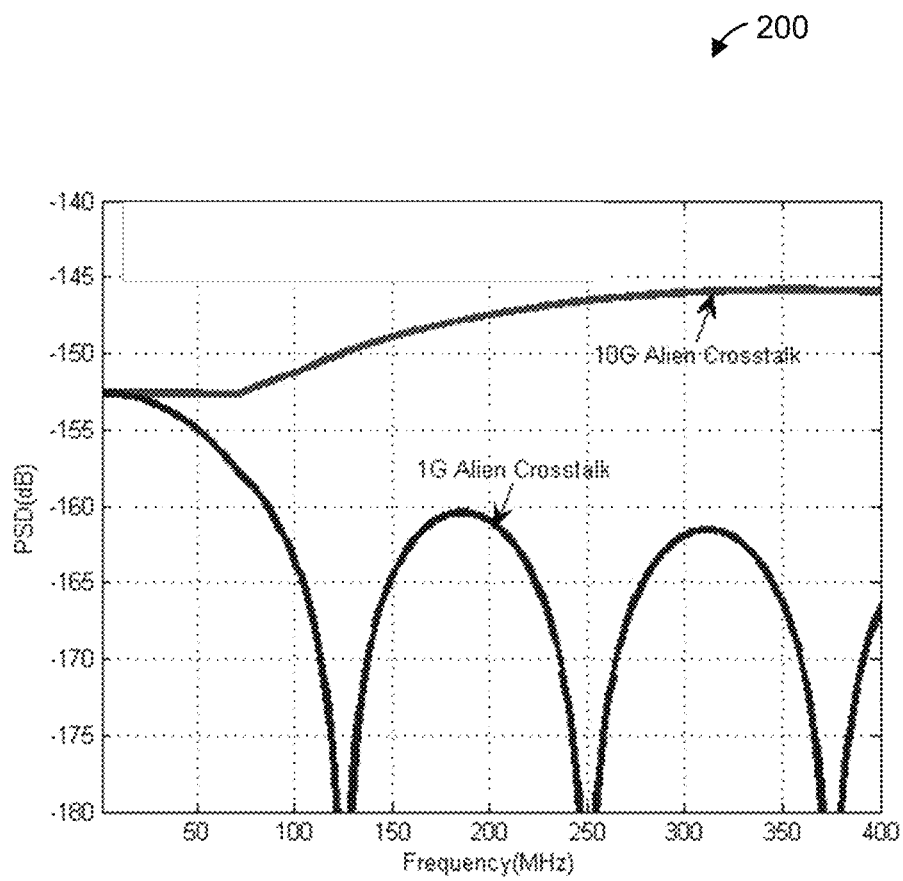
FIG. 2 is a plot of power spectral density (PSD) of alien crosstalk between Cat5e cables versus frequency.

FIG. 2 is a plot of power spectral density (PSD) of alien crosstalk between Cat5e cables versus frequency in a particular experimental network arrangement. In particular, FIG. 2 illustrates PSD of alien crosstalk caused by 10G Ethernet transmissions and 1G Ethernet transmissions in the particular experimental network arrangement. Alien crosstalk is highly dependent on physical implementation and traffic characteristics, and general models of alien crosstalk are not well defined. Thus, FIG. 2 is merely intended to be illustrative of general behavior of alien crosstalk in a particular experimental setting.

In the experimental network arrangement corresponding to FIG. 2, the PSD of alien crosstalk caused by 1G Ethernet ("1G alien crosstalk") remains at levels that do not adversely affect other 1G Ethernet transmissions to a significant degree. Additionally, the PSD of 1G alien crosstalk generally decreases as frequency increases. Thus, in the experimental network arrangement corresponding to FIG. 2, alien crosstalk caused by 1G Ethernet transmissions tends to not adversely affect either other 1G Ethernet transmissions or other 10G Ethernet transmissions.

The PSD of alien crosstalk caused by 10G Ethernet ("10G alien crosstalk") is approximately constant (e.g., approximately −152.5 dB) for frequencies generally corresponding to 1G Ethernet, but then generally rises as frequency increases. Thus, in contrast to PSD of 1G alien crosstalk, the PSD of 10G alien crosstalk generally increases with frequency in frequencies generally overlapping with 10G Ethernet transmissions.

Additionally, as can be seen in FIG. 2, PSD of 10G alien crosstalk is significantly greater than the PSD of 1G alien crosstalk for higher frequencies.

Referring again to FIG. 1, when the transceiver 124-2 transmits at a baud rate corresponding to 1G Ethernet, alien crosstalk will occur in the cables 112-1 and 112-3. Similarly, when the transceivers 124-1 and 124-3 transmit at the baud rate corresponding to 1G Ethernet, alien crosstalk will occur in the cable 112-2. However, the PSD of such alien crosstalk remains at levels that do not adversely affect other Ethernet transmissions at higher baud rates to a significant degree. For example, as discussed above with reference to FIG. 2, the PSD of 1G alien crosstalk caused by the transmissions of a transceiver 124 generally decreases as frequency increases. Thus, near end alien crosstalk caused by a transceiver 124 transmitting at the baud rate corresponding to 1G Ethernet does not adversely affect reception by other transceivers 124 of Ethernet transmissions at higher baud rates (e.g., corresponding to 10G) to a significant degree.

When the transceiver 120-2 transmits at a baud rate corresponding to 10G Ethernet, alien crosstalk will occur in the cables 112-1 and 112-3. Similarly, when the transceivers 120-1 and 120-3 transmit at the baud rate corresponding to 10G Ethernet, alien crosstalk will occur in the cable 112-2. At frequencies generally corresponding to 1G Ethernet, the PSD of such alien crosstalk remains at levels that in and of themselves do not adversely affect other Ethernet transmissions to a significant degree. Additionally, because the transmissions by the transceivers 124 are at the lower baud rate (e.g., corresponding to 1G Ethernet), the signal received by each transceiver 120 can be lowpass filtered to remove higher frequency components of the 10G alien crosstalk. Thus, the PSD of 10G alien crosstalk caused by the transmissions of the transceivers 120 can be kept below levels that do not adversely affect reception of the 1G Ethernet transmissions from the transceivers 124 to a significant degree.

Thus, the transceivers 120 that transmit at the first baud rate while simultaneously receiving at the second baud rate are able to mitigate near end alien crosstalk (e.g., using lowpass filters) caused by the transmissions of other transceivers 120. Additionally, although the transceivers 124 that receive at the higher first baud rate while simultaneously transmitting at the lower second baud rate may experience near end alien crosstalk (e.g., 1G alien crosstalk) caused by the transmissions of other transceivers 124, such near end alien crosstalk remains at PSD levels that do not adversely affect reception at the transceivers 124 to a significant degree.

In some embodiments, each of at least some of the transceivers 120 is configured to transmit using a baud rate corresponding to a minimum bandwidth that exceeds a maximum bandwidth rating of the respective cable 112. In some embodiments, each of at least some of the transceivers 120 is configured to transmit using a baud rate corresponding to a minimum bandwidth that exceeds the maximum bandwidth rating of the respective cable 112 by at least 75 MHz. In other embodiments, each of at least some of the transceivers 120 is configured to transmit using a baud rate corresponding to a minimum bandwidth that exceeds the maximum bandwidth rating of the respective cable 112 by at least 100 MHz. In other embodiments, each of at least some of the transceivers 120 is configured to transmit using a baud rate corresponding to a minimum bandwidth that exceeds the maximum bandwidth rating of the respective cable 112 by at least 250 MHz.

In some embodiments, each of at least some of the transceivers 120 additionally is configured to receive at a baud rate corresponding to a minimum bandwidth that is less than or equal to the maximum bandwidth rating of the respective cable 112.

In some embodiments, each of at least some of the transceivers 124 is configured to receive at a baud rate corresponding to a minimum bandwidth that exceeds a maximum bandwidth rating of the cable 112. In some embodiments, each of at least some of the transceivers 124 is configured to receive at a baud rate corresponding to a minimum bandwidth that exceeds the maximum bandwidth rating of the cable 112 by at least 75 MHz. In other embodiments, each of at least some of the transceivers 124 is configured to receive at a baud rate corresponding to a minimum bandwidth that exceeds the maximum bandwidth rating of the cable 112 by at least 100 MHz. In other embodiments, each of at least some of the transceivers 124 is configured to receive at a baud rate corresponding to a minimum bandwidth that exceeds the maximum bandwidth rating of the cable 112 by at least 250 MHz.

In some embodiments, each of at least some of the transceivers 124 additionally is configured to transmit at a baud rate corresponding to a minimum bandwidth that is less than or equal to the maximum bandwidth rating of the cable 112.

Although FIG. 1 was discussed in the context of transmissions in the downlink direction being at the higher first baud rate and transmissions in the uplink direction being at the lower second baud rate, in other embodiments it is useful to have transmissions in the downlink direction being at the lower second baud rate and transmissions in the uplink direction being at the higher first baud rate. For example, in an embodiment, the endpoints 108 correspond to video cameras (e.g., the communication system 100 corresponds to a security system) that transmit video data to the network device 104 in the uplink direction, whereas the network device 104 transmits a relatively smaller amount of data to the endpoints 108 in the downlink direction. In such an embodiment, the amount of data travelling in an uplink direction is significantly greater than the amount of data travelling in the downlink direction.

Thus, in some embodiments, each transceiver 120 is configured to transmit at the lower second baud rate and receive at the higher first baud rate; and each transceiver 124 is configured to transmit at the higher first baud rate and receive at the lower second baud rate.

In some embodiments, the network device 104 includes a controller 140 that is configured to determine a direction of baud rate asymmetry to be utilized in the network 100. For example, the controller 140 monitors amounts of network traffic in the downlink direction as compared to the uplink direction and determines in which direction (e.g., downlink or uplink) a higher baud rate should be used, according to an embodiment. In such an embodiment, the controller 140 informs at least the transceivers 120 (and optionally the transceivers 124) of at least in which direction (e.g., downlink or uplink) a higher baud rate should be used. Although the controller 140 is illustrated as being a component of the network device 104, in some embodiments the controller 140 is separate from the network device 104 and communicatively coupled to the network device. In some embodiments, the controller 140 is omitted from the communication system 100.

In some embodiments, transceivers 120 and transceivers 140 are capable of using a plurality of different baud rates in the downlink direction and/or using a plurality of different baud rates in the uplink direction. In some such embodiments, transceivers 120 and transceivers 140 are configured to negotiate with one another regarding baud rates to use in the uplink direction and the downlink direction with one or more constraints, such as one or more of i) the baud rate in the downlink direction must be higher than the baud rate in the uplink direction, or vice versa; ii) all transceivers 120 must utilize a same transmission baud rate; iii) all transceivers 120 must utilize at least a minimum transmission baud rate; iv) all transceivers 120 must utilize at most a maximum transmission baud rate; v) all transceivers 124 must utilize a same transmission baud rate; vi) all transceivers 124 must utilize at least a minimum transmission baud rate; vii) all transceivers 124 must utilize at most a maximum transmission baud rate; etc.

In other embodiments, each of one or more transceivers 120 is capable of transmitting only at the higher first baud rate and/or is capable of receiving only at the lower second baud rate, or vice versa. Similarly, in some embodiments, each of one or more transceivers 124 is capable of receiving only at the higher first baud rate and/or is capable of transmitting only at the lower second baud rate, or vice versa.

Figure 3:
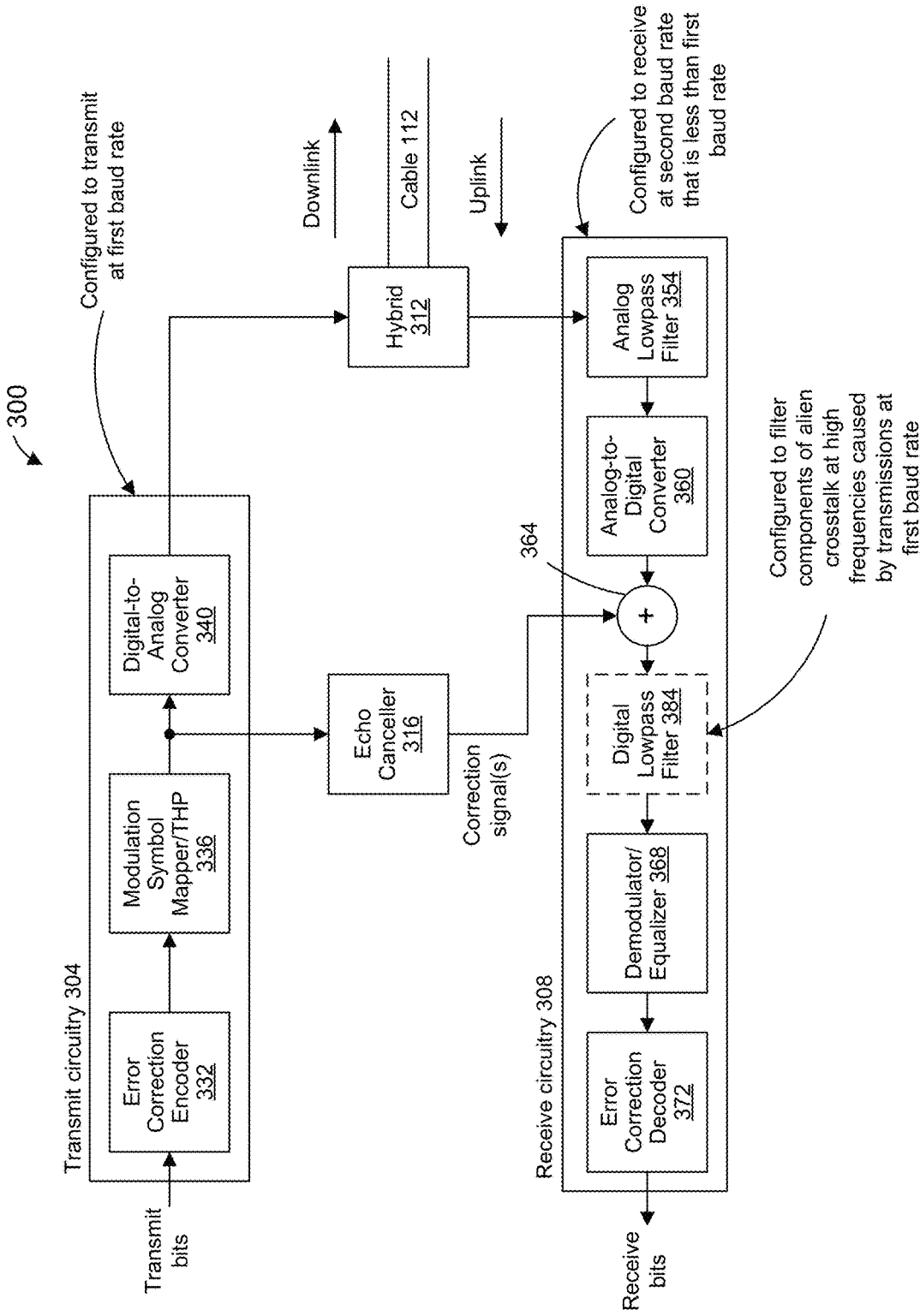
FIG. 3 is a simplified block diagram of an example transceiver that is configured to transmit at a first baud rate while simultaneously receiving at a second baud rate that is lower than the first baud rate, according to an embodiment.

FIG. 3 is a simplified block diagram of an example transceiver 300 that is configured to transmit at a first baud rate while simultaneously receiving at a second baud rate that is lower than the first baud rate, according to an embodiment. The transceiver 300 is utilized for each of at least some of the transceivers 120 of FIG. 1, according to some embodiments, and FIG. 3 is described with reference to FIG. 1 for explanatory purposes. In other embodiments, the transceiver 300 is utilized in another suitable communication system different from the communication system 100 of FIG. 1, and/or the some or all of the transceivers 120 of FIG. 1 correspond to a suitable transceiver different from the example transceiver 300 of FIG. 3.

According to an embodiment, the transceiver 300 is coupled to a cable 112, for example via suitable cable connectors (not shown), such as male and female RJ45 connectors, male and female M12 connectors, etc.

The transceiver 300 comprises transmit circuitry 304 that is configured to transmit at a first baud rate. In some embodiments, the first baud rate corresponds to a signal bandwidth that exceeds a maximum frequency rating of the cable 112. In an embodiment, the first baud rate is approximately 800 Megasymbols per second (MSps) (i.e., 800 MSps±8 MSps). In another embodiment, the first baud rate is approximately 400 MSps (i.e., 400 MSps±4 MSps). More generally, a minimum required bandwidth corresponding to the first baud rate exceeds a maximum frequency rating of the cable 112, according to some embodiments. For example, the cable 112 is a legacy cable having a maximum frequency rating that is less than the minimum required bandwidth corresponding to the first baud rate, according to some embodiments.

The transceiver 300 also comprises receive circuitry 308 that is configured to receive at a second baud rate that is lower than the first baud rate. In an embodiment, the second baud rate is approximately 125 MSps (i.e., 125 MSps±1 MHz). In another embodiment, the second baud rate is approximately 200 MSps (i.e., 200 MSps±2 MSps). In another embodiment in which the first baud rate is approximately 800 MSps, the second baud rate is approximately 400 MSps (i.e., 400 MSps±4 MSps). In some embodiments, a minimum required bandwidth corresponding to the second baud rate is less than or equal to a maximum frequency rating of the cable 112, according to some embodiments. For example, the cable 112 is a legacy cable having a maximum frequency rating that is greater than or equal to the minimum required bandwidth corresponding to the second baud rate, according to some embodiments.

The transmit circuitry 304 transmits at the first baud rate simultaneously with the receive circuitry 308 receiving at the second baud rate.

One transmit circuitry block 304 and one receive circuitry block 308 are illustrated in FIG. 3 to simplify the figure. However, in embodiments in which the cable 112 includes multiple twisted wire pairs, the transceiver 300 comprises a respective transmit circuitry block 304 and a respective receive circuitry block 308 for each twisted wire pair in the cable 112. For instance, each transmit circuitry block 304 generates a respective transmit signal for a respective twisted wire pair, and each receive circuitry block 308 processes a respective receive signal from a respective twisted wire pair. Thus, for a cable 112 that comprises four twisted wire pairs, the transceiver 300 comprises four transmit circuitry blocks 304 and four receive circuitry blocks 308, according to an embodiment.

The transmit circuitry 304 is coupled to the cable 112 via a hybrid circuit 312, and the receive circuitry 308 is coupled to the cable 112 via the hybrid circuit 312. The hybrid circuit 312 is configured to pass a transmit signal generated by the transmit circuitry 304 to the cable 112, and to prevent the transmit signal from passing to the receive circuitry 308. Additionally, the hybrid circuit 312 is configured to pass a receive signal received from the cable 112 to the receive circuitry 308. In an embodiment, the hybrid circuit 312 is configured to prevent the receive signal from passing to the transmit circuitry 304.

The transceiver 300 comprises an echo canceller 316 that is configured to reduce echo associated with full duplex communications. In an embodiment, the echo canceller 316 is configured to generate a respective correction signal for each receive circuitry block 308. In an embodiment, the echo canceller 316 is configured to generate the one or more correction signal using respective signals generated by the respective transmit circuitry blocks 304.

The transmit circuitry 304 comprises an error correction encoder 332 that encodes information bits that are to be transmitted ("transmit bits") via the cable 112 according to a suitable error correction code to generate encoded transmit bits. In an illustrative embodiment, the error correction encoder 332 is configured to encode the transmit bits according to a low-density parity check (LDPC) code. In other embodiments, the error correction encoder 332 is configured to encode the transmit bits according to another suitable error correction code.

The transmit circuitry 304 also comprises a modulation symbol mapper 336 that is configured to map the encoded transmit bits to modulation symbols. In some embodiments, the modulation symbol mapper 336 is also configured to implement Tomlinson-Harashima precoding (THP) ("modulation symbol mapper/THP 336"). In an embodiment, the modulation symbol mapper 336 outputs modulation symbols at the first baud rate.

The transmit circuitry 304 further comprises a digital-to-analog converter (DAC) 340 that is configured to convert the output of the modulation symbol mapper 336 to an analog transmit signal for transmission via the cable 112.

The receive circuitry 308 comprises an analog lowpass filter 354 coupled to the hybrid circuit 512. The receive circuitry 308 also comprises an analog-to-digital converter (ADC) 360 coupled to the lowpass filter 354. The ADC 360 is configured to convert an analog receive signal (received via the cable 112) to a digital receive signal. In an embodiment, the analog lowpass filter 354 is an antialiasing filter that is configured to attenuate high frequency components of the receive signal prior to sampling by the ADC 360 to attenuate aliasing of the high frequency components caused by the sampling process.

The receive circuitry 308 also comprises a summation circuit 364 that is configured to add a correction signal generated by the echo canceller 316 to the digital receive signal to mitigate crosstalk from one or more transmits signals generated by the transmit circuitry blocks 304.

The receive circuitry 308 further comprises demodulator/equalizer 368 that is configured to equalize the digital receive signal and to convert modulation symbols to encoded information bits.

The receive circuitry 308 also comprises an error correction decoder 372 that generates receive bits by decoding, according to the error correction code used by a transmitter, encoded information bits that are output by the demodulator/equalizer 368. In an illustrative embodiment, the error correction encoder 372 is configured to decode the encoded receive bits according to an LDPC code. In other embodiments, the error correction decoder 372 is configured to decode the encoded receive bits according to another suitable error correction code.

The receive circuitry 308 further comprises a digital lowpass filter 384 that is configured to attenuate components of alien crosstalk at high frequencies caused by transmissions at the first baud rate in other cables 112. Referring to FIGS. 1 and 3, if the transceiver 300 (FIG. 3) corresponds to the transceiver 120-2 (FIG. 1), the digital lowpass filter 384 is configured to attenuate components of alien crosstalk at high frequencies caused at least by transmissions by the transceiver 120-1 and the transceiver 120-3 at the first baud rate in cables 112-1 and 112-3, respectively, according to an illustrative embodiment. Similarly, if the transceiver 300 (FIG. 3) corresponds to the transceiver 120-1 (FIG. 1), the digital lowpass filter 384 is configured to attenuate components of alien crosstalk at high frequencies caused at least by transmissions by the transceiver 120-2 at the first baud rate in the cable 112-2, according to another illustrative embodiment. Similarly, if the transceiver 300 (FIG. 3) corresponds to the transceiver 120-3 (FIG. 1), the digital lowpass filter 384 is configured to attenuate components of alien crosstalk at high frequencies caused at least by transmissions by the transceiver 120-2 at the first baud rate in the cable 112-2, according to another illustrative embodiment.

In an embodiment, the digital lowpass filter 384 is configured to significantly attenuate (i.e., at least by −6 dB) at frequencies above a suitable cutoff frequency. In some embodiments, the cutoff frequency will vary depending on the first baud rate and the second baud rate used by the transceiver 300. In other embodiments, the cutoff frequency will vary depending on i) the second baud rate, and ii) a third baud rate of another signal being transmitted in another cable (not shown) and that is causing crosstalk in the receive signal received by the receive circuitry 308, the other signal being transmitted by another transceiver (not shown) at the third baud rate. In some embodiments in which multiple lowpass filters are included (described further below), the multiple lowpass filters together significantly attenuate at frequencies above the cutoff frequency.

In some embodiments, the digital lowpass filter 384 is coupled between the summation circuit 364 and the demodulator/equalizer 368 to filter the digital receive signal prior to the digital receive signal being processed by the demodulator/equalizer 368. In some embodiments, the digital lowpass filter 384 is coupled between the demodulator/equalizer 368 and the error correction decoder 372 to filter the digital receive signal prior to the digital receive signal being processed by the error correction decoder 372. In some embodiments, the digital lowpass filter 384 is coupled between the ADC 360 and the summation circuit 364 to filter the digital receive signal prior to the digital receive signal being processed by the summation circuit 364. In some embodiments, the digital lowpass filter 384 is implemented as multiple digital lowpass filters located at two or more of the following locations: i) between the ADC 360 and the summation circuit 364, ii) between the summation circuit 364 and the demodulator/equalizer 368, iii) between the demodulator/equalizer 368 and the error correction decoder 372, etc.

In some embodiments, the digital lowpass filter 384 is omitted. For example, the analog lowpass filter 354 is configured to attenuate components of alien crosstalk at high frequencies to a sufficient degree, at least in some network implementations. As another example, in some network implementations, the level of high frequency components of the alien crosstalk, coupled with the higher robustness of the receive signal at the slower second baud rate (as compared to the transmit signal at the faster first baud rate), is at a level that provides an adequate error rate for the receive signal without requiring the use of the digital lowpass filter 384.

In operation (in the example network 100 of FIG. 1, the transceiver 300 is located at the network device 104, according to an embodiment), the transmit circuitry 304 generates a transmit signal at the first baud rate for transmission via the cable 112, and, simultaneously, the receive circuitry 308 receives and processes a receive signal that was transmitted via the cable 112 at the second baud rate that is slower than the first baud rate. As discussed above, the largest component of alien crosstalk experienced by the receive circuitry 308 typically is near-end alien crosstalk caused by transmissions of one or more other transceivers located near the transceiver 300. However, because the receive signal was transmitted at the lower second baud rate, the lowpass filter(s) 384 is able to remove higher frequency components of the near-end alien crosstalk, whereas lower frequency components of the near-end alien crosstalk are at lower PSDs (compared to the higher frequency components of the near-end alien crosstalk) and thus do not adversely affect decoding of the receive signal to a significant degree. In some embodiments in which the digital lowpass filter 384 is omitted, the analog lowpass filter 354 is configured to attenuate high frequency components of the alien crosstalk to a sufficient degree. In other embodiments in which the digital lowpass filter 384 is omitted, the level of high frequency components of the alien crosstalk, coupled with the higher robustness of the receive signal at the slower second baud rate (as compared to the transmit signal at the faster first baud rate), is at a level that provides an adequate error rate for the receive signal.

In some embodiments, the transmit circuitry 304 is configured to transmit using a baud rate corresponding to a minimum bandwidth that exceeds a maximum bandwidth rating of the cable 112. In some embodiments, the transmit circuitry 304 is configured to transmit using a baud rate corresponding to a minimum bandwidth that exceeds the maximum bandwidth rating of the cable 112 by at least 75 MHz. In other embodiments, the transmit circuitry 304 is configured to transmit using a baud rate corresponding to a minimum bandwidth that exceeds the maximum bandwidth rating of the cable 112 by at least 100 MHz. In other embodiments, the transmit circuitry 304 is configured to transmit using a baud rate corresponding to a minimum bandwidth that exceeds the maximum bandwidth rating of the cable 112 by at least 250 MHz.

In some embodiments, the receive circuitry 308 additionally is configured to receive at a baud rate corresponding to a minimum bandwidth that is less than or equal to the maximum bandwidth rating of the cable 112.

In some embodiments, one or more (or all) of the error correction encoder 332, the modulation symbol mapper/THP 336, the echo canceller 316, the digital lowpass filter 384 (if included), the summation circuit 364, the demodulator/equalizer 368, and the error correction decoder 372 are implemented using respective digital circuitry; and/or one or more (or all) of the error correction encoder 332, the modulation symbol mapper/THP 336, the echo canceller 316, the digital lowpass filter 384 (if included), the summation circuit 364, the demodulator/equalizer 368, and the error correction decoder 372 are implemented by one or more digital signal processors (DSPs) (not shown) that execute machine readable instructions stored in one or more memories (not shown) coupled to the one or more DSPs.

In some embodiments, the transmit circuitry 304 is capable of transmitting at a plurality of different baud rates and/or the receive circuitry 308 is capable of receiving at a plurality of different baud rates. In some such embodiments, the digital lowpass filter 384 is configurable to implement lowpass filters with different cutoff frequencies appropriate for the baud rates being used by the transmit circuitry 304 and the receive circuitry 308.

In embodiments in which the transmit circuitry 304 is capable of transmitting at a second baud rate that is lower than a first baud rate at which the receive circuitry 308 is receiving, the receive circuitry 308 is configurable to deactivate the digital lowpass filter 384 (e.g., so that a signal passes through the digital lowpass filter 384 without being modified) or to bypass the digital lowpass filter 384 (e.g., so that a signal passes around the digital lowpass filter 384 without being modified).

Figure 4:
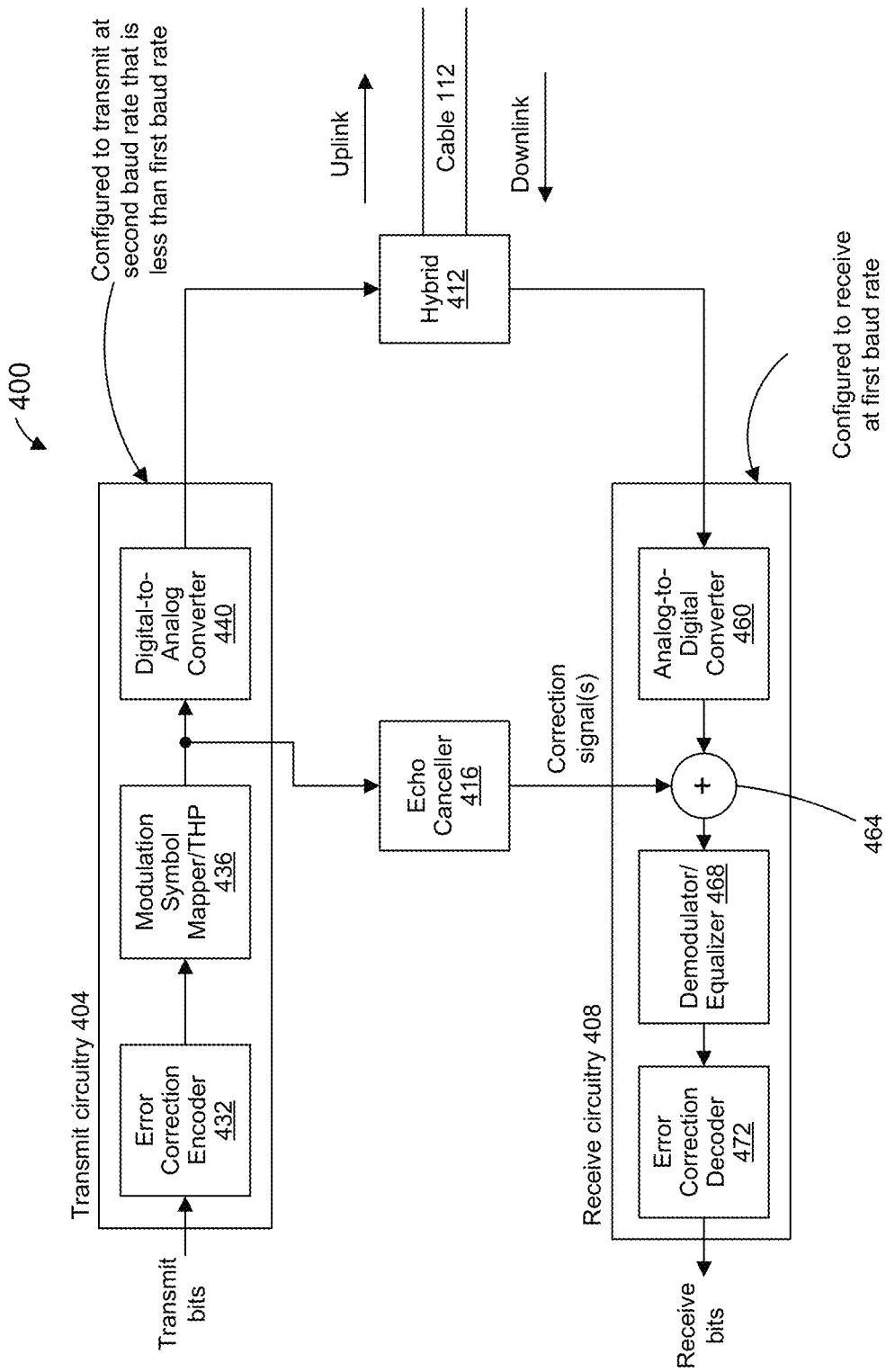
FIG. 4 is a simplified block diagram of an example transceiver that is configured to receive at the first baud rate while simultaneously transmitting at the second baud rate that is lower than the first baud rate, according to an embodiment.

FIG. 4 is a simplified block diagram of an example transceiver 400 that is configured to receive at the first baud rate and while simultaneously transmitting at the second baud rate that is lower than the first baud rate, according to an embodiment. The transceiver 400 is utilized for each of at least some of the transceivers 124 in the endpoint devices 108 of FIG. 1, according to some embodiments, and FIG. 4 is described with reference to FIG. 1 for explanatory purposes. In other embodiments, the transceiver 400 is utilized in another suitable communication system different from the communication system 100 of FIG. 1, and/or the some or all of the transceivers 124 of FIG. 1 correspond to a suitable transceiver different from the example transceiver 400 of FIG. 4.

According to an embodiment, the transceiver 400 is coupled to a cable 112, for example via suitable cable connectors (not shown), such as male and female RJ45 connectors, male and female M12 connectors, etc.

The transceiver 400 comprises transmit circuitry 404 that is configured to transmit at the second baud rate that is lower than the first baud rate. For example, the second baud rate is approximately 125 MSps (i.e., 125 MSps±1 MSps).

The transceiver 400 also comprises receive circuitry 408 that is configured to receive at the first baud rate that corresponds to a signal bandwidth that exceeds a maximum frequency rating of the cable 112. For example, the first baud rate is approximately 800 MSps (i.e., 800 MSps±8 MSps), according to an embodiment.

The transmit circuitry 404 transmits at the second baud rate simultaneously with the receive circuitry 408 receiving at the first baud rate.

One transmit circuitry block 404 and one receive circuitry block 408 are illustrated in FIG. 4 to simplify the figure. However, in embodiments in which the cable 112 includes multiple twisted wire pairs, the transceiver 400 comprises a respective transmit circuitry block 404 and a respective receive circuitry block 408 for each twisted wire pair in the cable 112, according to an embodiment. For instance, each transmit circuitry block 404 generates a respective transmit signal for a respective twisted wire pair, and each receive circuitry block 408 processes a respective receive signal from a respective twisted wire pair. Thus, for a cable 112 that comprises four twisted wire pairs, the transceiver 400 comprises four transmit circuitry blocks 404 and four receive circuitry blocks 408, according to an embodiment.

The transmit circuitry 404 is coupled to the cable 112 via a hybrid circuit 412, and the receive circuitry 408 is coupled to the cable 112 via the hybrid circuit 412. The hybrid circuit 412 is configured to pass a transmit signal generated by the transmit circuitry 404 to the cable 112, and to prevent the transmit signal from passing to the receive circuitry 408. Additionally, the hybrid circuit 412 is configured to pass a receive signal received from the cable 112 to the receive circuitry 408. In an embodiment, the hybrid circuit 412 is configured to prevent the receive signal from passing to the transmit circuitry 404.

The transceiver 400 comprises an echo canceller 416 that is configured to reduce echo associated with full duplex communications. In an embodiment, the echo canceller 416 is configured to generate a respective correction signal for each receive circuitry block 408. In an embodiment, the echo canceller 416 is configured to generate the one or more correction signal using respective signals generated by the respective transmit circuitry blocks 404.

The transmit circuitry 404 comprises an error correction encoder 432 that encodes information bits that are to be transmitted ("transmit bits") via the cable 112 according to a suitable error correction code to generate encoded transmit bits. In an illustrative embodiment, the error correction encoder 432 is configured to encode the transmit bits according to an LDPC code. In other embodiments, the error correction encoder 432 is configured to encode the transmit bits according to a Reed-Solomon code or another suitable error correction code.

The transmit circuitry 404 also comprises a modulation symbol mapper 436 that is configured to map the encoded transmit bits to modulation symbols. In some embodiments, the modulation symbol mapper 436 is also configured to implement THP ("modulation symbol mapper/THP 436"). In an embodiment, the modulation symbol mapper 436 outputs modulation symbols at the second baud rate.

The transmit circuitry 404 further comprises a DAC 440 that is configured to convert the output of the modulation symbol mapper 436 to an analog transmit signal for transmission via the cable 112.

The receive circuitry 408 comprises an ADC 460 that is configured to convert an analog receive signal (received via the cable 112) to a digital receive signal.

The receive circuitry 408 also comprises a summation circuit 464 that is configured to add a correction signal generated by the echo canceller 416 to the digital receive signal to mitigate crosstalk from one or more transmits signals generated by the transmit circuitry blocks 404.

The receive circuitry 408 further comprises demodulator/equalizer 468 that is configured to equalize the digital receive signal and to convert modulation symbols to encoded information bits.

The receive circuitry 408 also comprises an error correction decoder 472 that generates receive bits by decoding, according to the error correction code used by a transmitter, encoded information bits that are output by the demodulator/equalizer 468. In an illustrative embodiment, the error correction encoder 472 is configured to decode the encoded receive bits according to an LDPC code. In another illustrative embodiment, the error correction encoder 472 is configured to decode the encoded receive bits according to a Reed-Solomon code. In other embodiments, the error correction decoder 472 is configured to decode the encoded receive bits according to another suitable error correction code.

In operation, the transmit circuitry 404 generates a transmit signal at the second baud rate (which is slower than the first baud rate) for transmission via the cable 112, and, simultaneously, the receive circuitry 408 receives and processes a receive signal that was transmitted via the cable 112 at the first baud rate. As discussed above, the largest component of alien crosstalk experienced by the receive circuitry 408 typically is near-end alien crosstalk caused by transmissions of one or more other transceivers located near the transceiver 400. However, because signals transmitted by other transceivers located near the transceiver 400 were transmitted at the lower second baud rate, alien crosstalk caused by such signals do not adversely affect decoding of the receive signal to a significant degree. Additionally, because the transmit signal generated and transmitted by the transmit circuitry 404 at the lower second baud rate, alien crosstalk caused by the transmit signal do not adversely affect to a significant degree decoding of receive signals at other transceivers located near the transceiver 400.

In some embodiments, one or more (or all) of the error correction encoder 432, the modulation symbol mapper/THP 436, the echo canceller 416, the summation circuit 464, the demodulator/equalizer 468, and the error correction decoder 472 are implemented using respective digital circuitry; and/or one or more (or all) of the error correction encoder 432, the modulation symbol mapper/THP 436, the echo canceller 416, the summation circuit 464, the demodulator/equalizer 468, and the error correction decoder 472 are implemented by one or more DSPs (not shown) that execute machine readable instructions stored in one or more memories (not shown) coupled to the one or more DSPs.

In some embodiments, the receive circuitry 408 is configured to receive at a baud rate corresponding to a minimum bandwidth that exceeds a maximum bandwidth rating of the cable 112. In some embodiments, the receive circuitry 408 is configured to receive at a baud rate corresponding to a minimum bandwidth that exceeds the maximum bandwidth rating of the cable 112 by at least 75 MHz. In other embodiments, the receive circuitry 408 is configured to receive at a baud rate corresponding to a minimum bandwidth that exceeds the maximum bandwidth rating of the cable 112 by at least 100 MHz. In other embodiments, the receive circuitry 408 is configured to receive at a baud rate corresponding to a minimum bandwidth that exceeds the maximum bandwidth rating of the cable 112 by at least 250 MHz.

In some embodiments, the transmit circuitry 404 additionally is configured to transmit at a baud rate corresponding to a minimum bandwidth that is less than or equal to the maximum bandwidth rating of the cable 112.

In some embodiments, the transmit circuitry 404 is capable of transmitting at a plurality of different baud rates and/or the receive circuitry 408 is capable of receiving at a plurality of different baud rates. In some such embodiments, the transceiver 400 includes one or more digital lowpass filters (not shown) similar to the digital lowpass filter 384 discussed above with reference to FIG. 3. In scenarios in which the transmit circuitry 404 transmits at a second baud rate that is lower than a first baud rate at which the receive circuitry 408 is receiving, the receive circuitry 408 is configurable to deactivate the digital lowpass filter(s) (e.g., so that a signal passes through the digital lowpass filter without being modified) or to bypass the digital lowpass filter(s) (e.g., so that a signal passes around the digital lowpass filter 384 without being modified). Similarly, in scenarios in which the transmit circuitry 404 transmits at a first baud rate that is higher than a second baud rate at which the receive circuitry 408 is receiving, the receive circuitry 408 is configurable to activate the digital lowpass filter(s) to reduce alien cross talk in a manner similar to the digital lowpass filter 354 discussed above with reference to FIG. 3.

Figure 5:
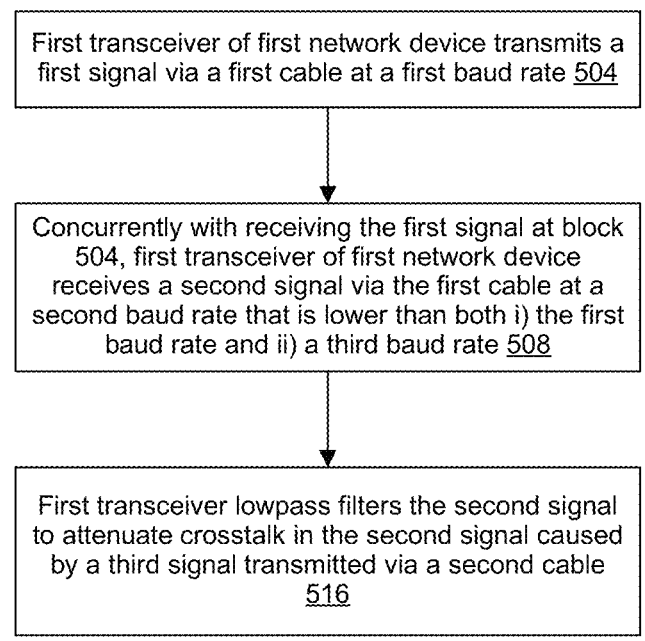
FIG. 5 is a flow diagram of an example method for communicating via a first cable, according to an embodiment.

FIG. 5 is a flow diagram of an example method 500 for communicating via a first cable, according to an embodiment. In an embodiment, the method 500 is implemented by the network device 104 of FIG. 1, and the method 500 is described with reference to FIG. 1 for ease of explanation. In another embodiment, the method 500 is implemented by one of the endpoint devices 108 of FIG. 1. In other embodiments, the method 500 is implemented by a suitable network device different from the network device 104 and the endpoint devices 108 of FIG. 1. In an embodiment, the method 500 is implemented using the transceiver 300 of FIG. 3, and the method 500 is described with reference to FIG. 3 for ease of explanation. In other embodiments, however, the method 500 is implemented using a suitable transceiver different from the transceiver 300 of FIG. 3.

In some embodiments in which an amount of data transmitted in a downlink direction within a communication network is higher than an amount of data transmitted in an uplink direction within the communication network, the method 500 is implemented at a transceiver that transmits in the downlink direction. In some embodiments in which an amount of data transmitted in an uplink direction within a communication network is higher than an amount of data transmitted in a downlink direction within the communication network, the method 500 is implemented at a transceiver that transmits in the uplink direction.

At block 504, a first transceiver of a first network device transmits a first signal via the first cable at a first baud rate. The first transceiver transmitting the first signal at block 504 comprises the transceiver 120-2 (FIG. 1) transmitting a first signal via the cable 112-2 at the first baud rate, according to an embodiment. The first transceiver transmitting the first signal at block 504 comprises the transceiver 300 (FIG. 3) transmitting a first signal via the cable 112 at the first baud rate, according to another embodiment.

In an embodiment, the first cable is a first legacy cable that is not rated to support a minimum required bandwidth corresponding to the first baud rate, at least for a length of the first legacy cable and/or for deployments in which alien crosstalk is at issue. In an embodiment, the first cable is a first legacy cable with a maximum frequency rating that is at most 50% of the minimum required bandwidth corresponding to the first baud rate (i.e., the minimum required bandwidth corresponding to the first baud rate is at least 200% more than the maximum frequency rating of the first legacy cable). In other respective embodiments, the first cable is a first legacy cable with a maximum frequency rating of at most 25%, or at most 60% of the minimum required frequency corresponding to the first baud rate (i.e., the first baud rate is at least 400% or 167%, respectively, of the maximum frequency rating of the first legacy cable). In an embodiment, the first cable is a Class D cable according to the current ISO/IEC 11801 Standard or a non-current version of the ISO/IEC 11801 Standard. In another embodiment, the first cable is a Class C cable according to the ISO/IEC 11801 Standard. In another embodiment, the first cable is a Class E cable according to the ISO/IEC 11801 Standard.

In an embodiment, the first baud rate is approximately 800 MSps. In an embodiment, the first baud rate corresponds to a first data rate of 10 Gbps. In another embodiment, the first baud rate is approximately 400 MSps. In an embodiment, the first baud rate corresponds to a first data rate of 5 Gbps.

At block 508, concurrently with transmitting the first signal at block 504, the first transceiver receives a second signal via the first cable, the second signal having been transmitted by a second network device at a second baud rate that is lower than both i) the first baud rate and ii) a third baud rate (discussed further below). The first transceiver receiving the second signal at block 508 comprises the transceiver 120-2 (FIG. 1) receiving a second signal via the cable 112-2 at the second baud rate, according to an embodiment. The first transceiver receiving the second signal at block 508 comprises the transceiver 300 (FIG. 3) receiving a second signal via the cable 112 at the second baud rate, according to another embodiment.

In an embodiment, the first cable has a maximum frequency rating that is greater than or equal to a minimum required bandwidth of the second baud rate.

In an embodiment, the second baud rate is approximately 100 MSps (i.e., 100 MSps±1 MSps). In another embodiment, the second baud rate is approximately 200 MSps (i.e., 200 MSps±2 MSps). In another embodiment in which the first baud rate is approximately 800 MSps and the third baud rate is also approximately 800 MSps, the second baud rate is approximately 400 MSps (i.e., 400 MSps±4 MSps).

In an embodiment, the third baud rate is approximately 800 MSps. In an embodiment, the third baud rate corresponds to a second data rate of 10 Gbps via the multiple second pairs of twisted wires of the second cable. In another embodiment, the third baud rate is approximately 400 MSps. In an embodiment, the third baud rate corresponds to a second data rate of 5 Gbps via the multiple second pairs of twisted wires of the second cable.

In some embodiments, the third baud rate is the same as the first baud rate. In other embodiments, the third baud rate is different than the first baud rate.

At block 516, the first transceiver lowpass filters the second signal received at block 508 to attenuate crosstalk in the second signal caused by transmission of a third signal at the third baud rate in a second cable. The first transceiver lowpass filtering the second signal at block 516 comprises the transceiver 120-2 (FIG. 1) lowpass filtering the second signal, according to an embodiment. The first transceiver lowpass filtering the second signal at block 516 comprises the transceiver 300 (FIG. 1) lowpass filtering the second signal using one or both of i) the analog lowpass filter 380 and ii) the digital lowpass filter 384, according to an embodiment.

In an embodiment, the second cable is a second legacy cable that is not rated to support a minimum required bandwidth corresponding to the third baud rate, at least for a length of the second legacy cable and/or for deployments in which alien crosstalk is at issue. In an embodiment, the second cable is a second legacy cable with a maximum frequency rating that is of at most 50% of the minimum required bandwidth corresponding to the third baud rate (i.e., the minimum required bandwidth corresponding to the third baud rate is at least 200% of the maximum frequency rating of the first legacy cable). In other respective embodiments, the second cable is a second legacy cable with a maximum frequency rating of at most 25%, or at most 60% of the minimum required bandwidth corresponding to the third baud rate (i.e., the minimum required bandwidth corresponding to the third baud rate is at least 400% or 167%, respectively, of the maximum frequency rating of the second legacy cable). In an embodiment, the second cable is a Class D cable according to the current ISO/IEC 11801 Standard or a non-current version of the ISO/IEC 11801 Standard. In another embodiment, the second cable is a Class C cable according to the ISO/IEC 11801 Standard. In another embodiment, the second cable is a Class E cable according to the ISO/IEC 11801 Standard.

In some embodiments, the third signal is transmitted in the second cable by another communication device separate from the first communication device. In other embodiments, the first communication device transmits the third signal in the second cable. For example, in some embodiments, the method 500 further comprises: concurrently with transmitting the first signal at block 504 and receiving the second signal at block 508, a second transceiver of the first network device transmitting the third signal at 512 at the third baud rate, and the second transceiver receiving a fourth signal via the second cable. The fourth signal is transmitted by a third network device at a fourth baud rate that is lower than both i) the first baud rate and ii) a third baud rate; and the second transceiver lowpass filters the fourth signal to attenuate crosstalk in the fourth signal caused by transmission of the first signal in the first cable at block 504, according to an embodiment.

In one embodiment in which the method 500 includes the second transceiver of the first network device receiving the fourth signal, the transceiver 120-1 (FIG. 1) receives the fourth signal via the cable 112-1 at the fourth baud rate, according to an embodiment. The second transceiver receiving the fourth signal comprises the transceiver 300 (FIG. 3) receiving a fourth signal via the cable 112 at the fourth baud rate, according to another embodiment.

In an embodiment, the fourth baud rate is approximately 100 MSps (i.e., 100 MSps±1 MSps). In another embodiment, the fourth baud rate is approximately 200 MSps (i.e., 200 MSps±2 MSps). In another embodiment in which the first baud rate is approximately 800 MSps and the third baud rate is also approximately 800 MSps, the fourth baud rate is approximately 400 MHz (i.e., 400 MSps±4 MSps).

In some embodiments, the fourth baud rate is the same as the second baud rate. In other embodiments, the fourth baud rate is different than the second baud rate.

The second transceiver lowpass filtering the fourth signal comprises the transceiver 120-1 (FIG. 1) lowpass filtering the fourth signal, according to an embodiment. The second transceiver lowpass filtering the fourth signal comprises the transceiver 300 (FIG. 1) lowpass filtering the fourth signal using one or both of i) the analog lowpass filter 380 and ii) the digital lowpass filter 384, according to an embodiment.

In some embodiments, transmitting the first signal at block 504 comprises transmitting the first signal in a downlink direction to the second network device; receiving the second signal at block 508 comprises receiving the second signal in an uplink direction from the second network device; and the third signal is transmitted in the downlink direction to the third network device.

In other embodiments, transmitting the first signal at block 504 comprises transmitting the first signal in an uplink direction to the second network device; receiving the second signal at block 508 comprises receiving the second signal in a downlink direction from the second network device; and the third signal is transmitted in the uplink direction to the third network device.

Figure 6:
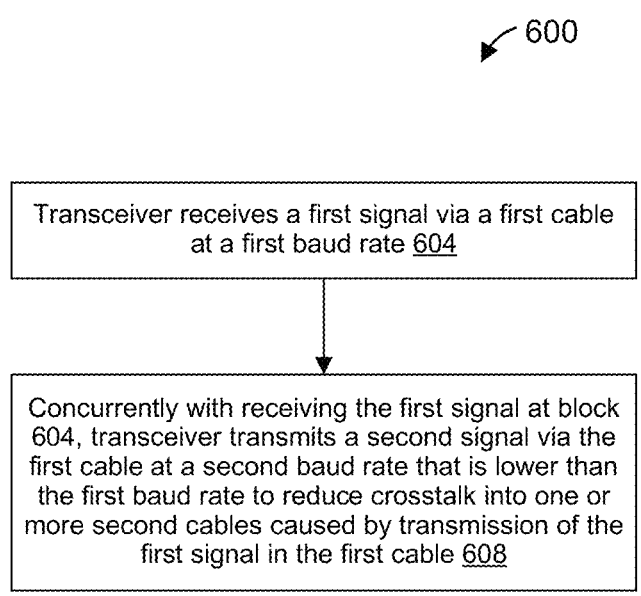
FIG. 6 is a flow diagram of an example method for communicating via a cable, according to another embodiment.

FIG. 6 is a flow diagram of an example method 600 for communicating via a first cable, according to an embodiment. In an embodiment, the method 600 is implemented by the endpoint device 108-2 of FIG. 1, and the method 600 is described with reference to FIG. 1 for ease of explanation. In another embodiment, the method 600 is implemented by the network device 104 of FIG. 1. In other embodiments, the method 600 is implemented by a suitable network device different from the network device 104 and the endpoint devices 108 of FIG. 1. In an embodiment, the method 600 is implemented using the transceiver 400 of FIG. 4, and the method 600 is described with reference to FIG. 4 for ease of explanation. In other embodiments, however, the method 600 is implemented using a suitable transceiver different from the transceiver 400 of FIG. 4.

In some embodiments in which an amount of data transmitted in a downlink direction within a communication network is higher than an amount of data transmitted in an uplink direction within the communication network, the method 600 is implemented at a transceiver that transmits in the uplink direction. In some embodiments in which an amount of data transmitted in an uplink direction within a communication network is higher than an amount of data transmitted in a downlink direction within the communication network, the method 600 is implemented at a transceiver that transmits in the downlink direction.

At block 604, a transceiver of a first network device receives a first signal via the first cable, the first signal having been transmitted by a second network device at a first baud rate. The transceiver receiving the first signal at block 604 comprises the transceiver 124-2 (FIG. 1) receiving a first signal via the cable 112-2 at the first baud rate, according to an embodiment. The transceiver receiving the first signal at block 604 comprises the transceiver 400 (FIG. 4) receiving a first signal via the cable 112 at the first baud rate, according to another embodiment.

In an embodiment, the first cable is a first legacy cable that is not rated to support the first baud rate, at least for a length of the first legacy cable and/or for deployments in which alien crosstalk is at issue. In an embodiment, the first cable is a first legacy cable with a maximum frequency rating that is of at most 25% of the first baud rate (i.e., the first baud rate is at least 400% of the maximum frequency rating of the first legacy cable). In other respective embodiments, the first cable is a first legacy cable with a maximum frequency rating of at most 33%, at most 15%, at most 12.5%, or at most 5% of the first baud rate (i.e., the first baud rate is at least 300%, 667%, 800%, or 2000%, respectively, of the maximum frequency rating of the first legacy cable). In an embodiment, the first cable is a Class D cable according to the current ISO/IEC 11801 Standard or a non-current version of the ISO/IEC 11801 Standard. In another embodiment, the first cable is a Class C cable according to the ISO/IEC 11801 Standard. In another embodiment, the first cable is a Class E cable according to the ISO/IEC 11801 Standard.

In an embodiment, the first baud rate is approximately 800 MSps. In an embodiment, the first baud rate corresponds to a first data rate of 10 Gbps via the multiple first pairs of twisted wires of the first cable. In another embodiment, the first baud rate is approximately 400 MSps. In an embodiment, the first baud rate corresponds to a first data rate of 5 Gbps via the multiple first pairs of twisted wires of the first cable.

At block 608, concurrently with receiving the first signal at block 604, the transceiver transmits a second signal via the first cable at a second baud rate that is lower than the first baud rate to reduce crosstalk from the first cable into one or more second cables. The first transceiver transmitting the second signal at block 608 comprises the transceiver 120-2 (FIG. 1) transmitting a second signal via the cable 112-2 at the second baud rate, according to an embodiment. The transceiver transmitting the second signal at block 608 comprises the transceiver 400 (FIG. 4) transmitting a second signal via the cable 112 at the second baud rate, according to another embodiment.

In an embodiment, the second baud rate is approximately 100 MSps (i.e., 100 MSps±1 MSps). In another embodiment, the second baud rate is approximately 200 MSps (i.e., 200 MSps±2 MSps). In another embodiment in which the first baud rate is approximately 800 MSps, the second baud rate is approximately 400 MSps (i.e., 400 MSps±4 MSps).

In an embodiment, the first cable is rated to support the second baud rate.

In some embodiments, receiving the first signal at block 604 comprises receiving the first signal in a downlink direction from the second network device; and transmitting the second signal at block 608 comprises transmitting the second signal in an uplink direction to the second network device. In other embodiments, receiving the first signal at block 604 comprises receiving the first signal in an uplink direction from the second network device; and transmitting the second signal at block 608 comprises transmitting the second signal in a downlink direction to the second network device.

As discussed above, transmitting the second signal via the first cable at the second baud rate reduces crosstalk from the first cable into one or more second cables. In some embodiments, at least one of the second cables is coupled to the second network device. In other embodiments, at least one of the second cables is not coupled to second network device, but instead is coupled to a third network device.

Figure 7:
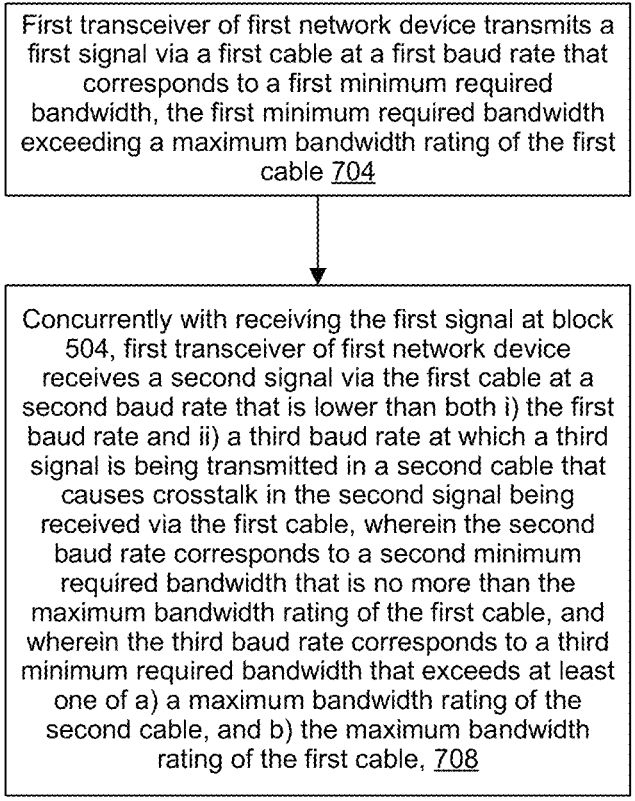
FIG. 7 is a flow diagram of another example method for communicating via a first cable, according to another embodiment.

FIG. 7 is a flow diagram of another example method 700 for communicating via a first cable, according to an embodiment. In an embodiment, the method 700 is implemented by the network device 104 of FIG. 1, and the method 700 is described with reference to FIG. 1 for ease of explanation. In another embodiment, the method 700 is implemented by one of the endpoint devices 108 of FIG. 1. In other embodiments, the method 700 is implemented by a suitable network device different from the network device 104 and the endpoint devices 108 of FIG. 1. In an embodiment, the method 700 is implemented using the transceiver 300 of FIG. 3, and the method 700 is described with reference to FIG. 3 for ease of explanation. In other embodiments, however, the method 700 is implemented using a suitable transceiver different from the transceiver 300 of FIG. 3.

In some embodiments in which an amount of data transmitted in a downlink direction within a communication network is higher than an amount of data transmitted in an uplink direction within the communication network, the method 700 is implemented at a transceiver that transmits in the downlink direction. In some embodiments in which an amount of data transmitted in an uplink direction within a communication network is higher than an amount of data transmitted in a downlink direction within the communication network, the method 700 is implemented at a transceiver that transmits in the uplink direction.

At block 704, a first transceiver of a first network device transmits a first signal via the first cable at a first baud rate that corresponds to a first minimum required bandwidth, the first minimum required bandwidth exceeding a maximum bandwidth rating of the first cable. The first transceiver transmitting the first signal at block 704 comprises the transceiver 120-2 (FIG. 1) transmitting a first signal via the cable 112-2 at the first baud rate, according to an embodiment. The first transceiver transmitting the first signal at block 704 comprises the transceiver 300 (FIG. 3) transmitting a first signal via the cable 112 at the first baud rate, according to another embodiment.

In an embodiment, the first cable is a first legacy cable that is not rated to support the minimum required bandwidth corresponding to the first baud rate, at least for a length of the first legacy cable and/or for deployments in which alien crosstalk is at issue. In an embodiment, the first cable is a first legacy cable with a maximum frequency rating that is at most 50% of the minimum required bandwidth corresponding to the first baud rate (i.e., the minimum required bandwidth corresponding to the first baud rate is at least 200% more than the maximum frequency rating of the first legacy cable). In other respective embodiments, the first cable is a first legacy cable with a maximum frequency rating of at most 25%, or at most 60% of the minimum required frequency corresponding to the first baud rate (i.e., the first baud rate is at least 400% or 167%, respectively, of the maximum frequency rating of the first legacy cable). In an embodiment, the first cable is a Class D cable according to the current ISO/IEC 11801 Standard or a non-current version of the ISO/IEC 11801 Standard. In another embodiment, the first cable is a Class C cable according to the ISO/IEC 11801 Standard. In another embodiment, the first cable is a Class E cable according to the ISO/IEC 11801 Standard.

In an embodiment, the first baud rate is approximately 800 MSps. In an embodiment, the first baud rate corresponds to a first data rate of 10 Gbps. In another embodiment, the first baud rate is approximately 400 MSps. In an embodiment, the first baud rate corresponds to a first data rate of 5 Gbps.

At block 708, concurrently with transmitting the first signal at block 504, the first transceiver receives a second signal via the first cable, the second signal having been transmitted by a second network device at a second baud rate that is lower than both i) the first baud rate and ii) a third baud rate at which a third signal is being transmitted in a second cable that causes crosstalk in the second signal being received via the first cable. In an embodiment, the second baud rate corresponds to a second minimum required bandwidth that is no more than the maximum bandwidth rating of the first cable. The third baud rate corresponds to a third minimum required bandwidth that exceeds a maximum bandwidth rating of the second cable, according to an embodiment. In another embodiment, the third minimum required bandwidth, in addition or alternatively to exceeding the maximum bandwidth rating of the second cable, exceeds the maximum bandwidth rating of the first cable.

Reception of the second signal at the second baud rate that is i) lower than the third baud rate, and ii) is no more than the maximum bandwidth rating of the first cable, facilitates mitigation of the crosstalk in the second signal caused by transmission of the third signal in the second cable at the third baud rate.

The first transceiver receiving the second signal at block 708 comprises the transceiver 120-2 (FIG. 1) receiving a second signal via the cable 112-2 at the second baud rate, according to an embodiment. The first transceiver receiving the second signal at block 708 comprises the transceiver 300 (FIG. 3) receiving a second signal via the cable 112 at the second baud rate, according to another embodiment.

In an embodiment, the second baud rate is approximately 100 MSps (i.e., 100 MSps±1 MSps). In another embodiment, the second baud rate is approximately 200 MSps (i.e., 200 MSps±2 MSps). In another embodiment in which the first baud rate is approximately 800 MSps and the third baud rate is also approximately 800 MSps, the second baud rate is approximately 400 MSps (i.e., 400 MSps±4 MSps).

In an embodiment, the third baud rate is approximately 800 MSps. In an embodiment, the third baud rate corresponds to a second data rate of 10 Gbps via the multiple second pairs of twisted wires of the second cable. In another embodiment, the third baud rate is approximately 400 MSps. In an embodiment, the third baud rate corresponds to a second data rate of 5 Gbps via the multiple second pairs of twisted wires of the second cable.

In some embodiments, the third baud rate is the same as the first baud rate. In other embodiments, the third baud rate is different than the first baud rate.

In some embodiments, the method 700 further includes the first transceiver lowpass filtering the second signal received at block 708 to attenuate crosstalk in the second signal caused by transmission of the third signal at the third baud rate in the second cable, similar to block 516 of FIG. 5. In other embodiments, the method 700 does not require the first transceiver to lowpass filter the second signal received at block 708 to attenuate crosstalk in the second signal caused by transmission of the third signal at the third baud rate in the second cable.

In an embodiment, the second cable is a second legacy cable that is not rated to support a minimum required bandwidth corresponding to the third baud rate, at least for a length of the second legacy cable and/or for deployments in which alien crosstalk is at issue. In an embodiment, the second cable is a second legacy cable with a maximum frequency rating that is of at most 50% of the minimum required bandwidth corresponding to the third baud rate (i.e., the minimum required bandwidth corresponding to the third baud rate is at least 200% of the maximum frequency rating of the first legacy cable). In other respective embodiments, the second cable is a second legacy cable with a maximum frequency rating of at most 25%, or at most 60% of the minimum required bandwidth corresponding to the third baud rate (i.e., the minimum required bandwidth corresponding to the third baud rate is at least 400% or 167%, respectively, of the maximum frequency rating of the second legacy cable). In an embodiment, the second cable is a Class D cable according to the current ISO/IEC 11801 Standard or a non-current version of the ISO/IEC 11801 Standard. In another embodiment, the second cable is a Class C cable according to the ISO/IEC 11801 Standard. In another embodiment, the second cable is a Class E cable according to the ISO/IEC 11801 Standard.

In some embodiments, the third signal is transmitted in the second cable by another communication device separate from the first communication device. In other embodiments, the first communication device transmits the third signal in the second cable. For example, in some embodiments, the method 700 further comprises: concurrently with transmitting the first signal at block 704 and receiving the second signal at block 708, a second transceiver of the first network device transmitting the third signal at the third baud rate, and the second transceiver receiving a fourth signal via the second cable. The fourth signal is transmitted by a third network device at a fourth baud rate that is lower than both i) the first baud rate and ii) a third baud rate, according to an embodiment. In some embodiments, the method 700 further comprises the second transceiver lowpass filtering the fourth signal to attenuate crosstalk in the fourth signal caused by transmission of the first signal in the first cable at block 704

In some embodiments, transmitting the first signal at block 704 comprises transmitting the first signal in a downlink direction to the second network device; receiving the second signal at block 708 comprises receiving the second signal in an uplink direction from the second network device; and the third signal is transmitted in the downlink direction to the third network device.

In other embodiments, transmitting the first signal at block 704 comprises transmitting the first signal in an uplink direction to the second network device; receiving the second signal at block 708 comprises receiving the second signal in a downlink direction from the second network device; and the third signal is transmitted in the uplink direction to the third network device.

Although embodiments described above utilize cables comprising one or more twisted wire pairs, other embodiments utilize other suitable cables having a metallic transmission medium, such as coaxial cables. In embodiments in which coaxial cables are used, transceivers such as described above are coupled to coaxial cables via suitable cable connectors (not shown), such as Bayone-Neill-Concelman (BNC) connectors, etc.

Embodiment 1: A first network device for communicating via a first cable, comprising: a first transmitter configured to transmit a first signal via the first cable at a first baud rate that corresponds to a first minimum required bandwidth, the first minimum required bandwidth exceeding a maximum bandwidth rating of the first cable; and a first receiver configured to receive a second signal via the first cable concurrently with transmitting the first signal via the first cable, the second signal having been transmitted by a second network device at a second baud rate that is lower than both i) the first baud rate and ii) a third baud rate at which a third signal is being transmitted in a second cable that causes crosstalk in the second signal being received via the first cable, wherein the second baud rate corresponds to a second minimum required bandwidth that is no more than the maximum bandwidth rating of the first cable, wherein the third baud rate corresponds to a third minimum required bandwidth that exceeds a maximum bandwidth rating of the second cable, and wherein reception of the second signal at the second baud rate that is i) lower than the third baud rate, and ii) is no more than the maximum bandwidth rating of the first cable, facilitates mitigation of the crosstalk in the second signal caused by transmission of the third signal in the second cable at the third baud rate.

Embodiment 2: The first network device of embodiment 1, wherein the third minimum required bandwidth exceeds the maximum bandwidth rating of the first cable.

Embodiment 3: The first network device of either of embodiments 1 or 2, further comprising a lowpass filter configured to attenuate the crosstalk in the second signal caused by transmission of the third signal in the second cable at the third baud rate.

Embodiment 4: The first network device of embodiment 3, wherein the lowpass filter comprises one or both of: i) one or more digital lowpass filters; and ii) an analog lowpass filter.

Embodiment 5: The first network device of any of embodiments 1-3, further comprising: a second transmitter configured to transmit the third signal via the second cable at the third baud rate concurrently with i) transmitting the first signal via the first cable and ii) receiving the second signal via the first cable; and a second receiver configured to receive a fourth signal via the second cable simultaneously with i) transmitting the first signal via the first cable, ii) receiving the second signal via the first cable, and iii) transmitting the third signal via the second cable, the fourth signal having been transmitted by a third network device at a fourth baud rate that is lower than both i) the first baud rate and ii) the third baud rate.

Embodiment 6: The first network device of embodiment 5, further comprising: a first lowpass filter configured to attenuate the crosstalk in the second signal caused by transmission of the third signal in the second cable at the third baud rate; and a second lowpass filter configured to attenuate the crosstalk in the fourth signal caused by transmission of the first signal in the first cable at the first baud rate.

Embodiment 7: The first network device of any of embodiments 1-6, wherein: the first transmitter is configured to transmit the first signal at a baud rate of approximately 800 Megasymbols per second (MSps); the first receiver is configured to receive the second signal at a baud rate of at most 400 MSps; and the third signal is transmitted at the baud rate of approximately 800 MSps.

Embodiment 8: The first network device of any of embodiments 1-7, wherein the first transmitter is configured to transmit the first signal to the second network device via the first cable in a downlink direction; the first receiver is configured to receive the second signal from the second network device via the first cable in an uplink direction; and the third signal is transmitted via the second cable in the downlink direction.

Embodiment 9: The first network device of any of embodiments 1-7, wherein: the first transmitter is configured to transmit the first signal to the second network device via the first cable in an uplink direction; the first receiver is configured to receive the second signal from the second network device via the first cable in a downlink direction; and the third signal is transmitted via the second cable in the uplink direction.

Embodiment 10: A method for communicating via a first cable, the method comprising: transmitting, by a first transceiver of a first network device, a first signal via the first cable at a first baud rate that corresponds to a first minimum required bandwidth, the first minimum required bandwidth exceeding a maximum bandwidth rating of the first cable; concurrently with transmitting the first signal via the first cable, receiving, by the first transceiver, a second signal via the first cable, the second signal having been transmitted by a second network device at a second baud rate that is lower than both i) the first baud rate and ii) a third baud rate at which a third signal is being transmitted in a second cable that causes crosstalk in the second signal being received via the first cable, wherein the second baud rate corresponds to a second minimum required bandwidth that is no more than the maximum bandwidth rating of the first cable, wherein the third baud rate corresponds to a third minimum required bandwidth that exceeds a maximum bandwidth rating of the second cable, and wherein reception of the second signal at the second baud rate that is i) lower than the third baud rate, and ii) is no more than the maximum bandwidth rating of the first cable, facilitates mitigation of the crosstalk in the second signal caused by transmission of the third signal in the second cable at the third baud rate.

Embodiment 11: The method of embodiment 10, wherein the third minimum required bandwidth exceeds the maximum bandwidth rating of the first cable.

Embodiment 12: The method of either of embodiments 10 or 11, further comprising: lowpass filtering, at the first transceiver, the second signal to attenuate the crosstalk in the second signal caused by transmission of the third signal in the second cable at the third baud rate.

Embodiment 13: The method of embodiment 12, wherein lowpass filtering the second signal to attenuate the crosstalk in the second signal caused by transmission of the third signal in the second cable at the third baud rate comprises one or both of: i) lowpass filtering a digital signal that correspond to the second signal with one or more digital lowpass filters; and ii) lowpass filtering an analog signal that correspond to the second signal with an analog lowpass filter.

Embodiment 14: The method of any of embodiments 10-12, further comprising: concurrently with i) transmitting the first signal via the first cable and ii) receiving the second signal via the first cable, transmitting, by a second transceiver of the first network device, the third signal via the second cable at the third baud rate; and concurrently with i) transmitting the first signal via the first cable, ii) receiving the second signal via the first cable, and iii) transmitting the third signal via the second cable, receiving, by the second transceiver, a fourth signal via the second cable, the fourth signal having been transmitted by a third network device at a fourth baud rate that is lower than both i) the first baud rate and ii) the third baud rate.

Embodiment 15: The method of embodiment 14, further comprising: lowpass filtering, at the first transceiver, the second signal to attenuate the crosstalk in the second signal caused by transmission of the third signal in the second cable at the third baud rate; and lowpass filtering, at the second transceiver, the fourth signal to attenuate the crosstalk in the fourth signal caused by transmission of the first signal in the first cable at the first baud rate.

Embodiment 16: The method of any of embodiments 10-15, wherein: transmitting the first signal via the first cable comprises transmitting the first signal at a baud rate of approximately 800 Megasymbols per second (MSps); receiving the second signal via the first cable comprises receiving the second signal at a baud rate of at most 400 MSps; and the third signal is transmitted via the second cable at the baud rate of approximately 800 MSps.

Embodiment 17: The method of any of embodiments 10-16, wherein: transmitting the first signal via the first cable comprises transmitting the first signal to the second network device in a downlink direction; receiving the second signal via the first cable comprises receiving the second signal from the second network device in an uplink direction; and the third signal is transmitted via the second cable in the downlink direction.

Embodiment 18: The method of any of embodiments 10-16, wherein: transmitting the first signal via the first cable comprises transmitting the first signal to the second network device in an uplink direction; receiving the second signal via the first cable comprises receiving the second signal from the second network device in a downlink direction; and the third signal is transmitted via the second cable in the uplink direction.

Embodiment 19: A first network interface for communicating via a first cable, comprising: a receiver configured to receive a first signal via the first cable, the first signal having been transmitted by a second network device at a first baud rate; and a transmitter configured to transmit, concurrently with the receiver receiving the first signal at the first baud rate, a second signal via the first cable at a second baud rate that is lower than the first baud rate to reduce crosstalk, caused by transmission of the second signal in the first cable, into one or more second cables.

Embodiment 20: The first network interface of embodiment 19, wherein: the receiver configured to receive the first signal at a first baud rate that corresponds to a minimum required bandwidth that exceeds a maximum frequency rating of the first cable; and the transmitter is configured to transmit, concurrently with the receiver receiving the first signal at the first baud rate, the second signal at a second baud rate that corresponds to a minimum required bandwidth that is less than or equal to the maximum frequency rating of the first cable.

Embodiment 21: The first network device of either of embodiments 19 or 20, wherein: the receiver is configured to receive the first signal at a baud rate of approximately 800 Megasymbols per second (MSps); and the transmitter is configured to transmit, concurrently with the receiver receiving the first signal at the first baud rate, the second signal at a baud rate of at most 400 MSps.

Embodiment 22: The first network device of any of embodiments 19-21, wherein: the receiver is configured to receive the first signal from the second network device via the first cable in a downlink direction; and the transmitter is configured to transmit the second signal to the second network device via the first cable in an uplink direction.

Embodiment 23: The first network device of any of embodiments 19-21, wherein: the receiver is configured to receive the first signal from the second network device via the first cable in an uplink direction; and the transmitter is configured to transmit the second signal to the second network device via the first cable in a downlink direction.

Embodiment 24: A method for communicating via a first cable, the method comprising: receiving, at a transceiver of a first network device, a first signal via the first cable, the first signal having been transmitted by a second network device at a first baud rate; and concurrently with receiving the first signal via the first cable, transmitting, by the transceiver, a second signal via the first cable at a second baud rate that is lower than the first baud rate to reduce crosstalk, caused by transmission of the second signal in the first cable, into one or more second cables.

Embodiment 25: The method of embodiment 24, wherein: receiving the first signal via the first cable comprises receiving the first signal at a first baud rate that corresponds to a minimum required bandwidth that exceeds a maximum frequency rating of the first cable; and transmitting the second signal via the first cable comprises transmitting the second signal at a second baud rate that corresponds to a minimum required bandwidth that is less than or equal to the maximum frequency rating of the first cable.

Embodiment 26: The method of either of embodiments claim 24 or 25, wherein: receiving the first signal via the first cable comprises receiving the first signal via a first Class D cable that i) complies with the ISO/IEC 11801 Standard for 100 MHz applications and ii) does not comply with the ISO/IEC 11801 Standard for frequencies above 100 MHz applications; and transmitting the second signal via the first cable comprises transmitting the second signal via the first Class D cable at the second baud rate that is lower than the first baud rate to reduce cross talk from the first Class D cable into one or more second Class D cables.

Embodiment 27: The method of any of embodiments 24-26, wherein: receiving the first signal via the first cable comprises receiving the first signal at a baud rate of approximately 800 Megasymbols per second (MSps); and transmitting the second signal via the first cable comprises transmitting, concurrently with receiving the first signal at the baud rate of approximately 800 MSps, the second signal at a baud rate of at most 400 MSps.

Embodiment 28: The method of any of embodiments 24-26, wherein: receiving the first signal via the first cable comprises receiving the first signal at a baud rate of approximately 400 Megasymbols per second (MSps); and transmitting the second signal via the first cable comprises transmitting, concurrently with receiving the first signal at the baud rate of approximately 400 MSps, the second signal at a baud rate of at most 100 MSps.

Embodiment 29: The method of any of embodiments 24-28, wherein: receiving the first signal via the first cable comprises receiving the first signal from the second network device via the first cable in a downlink direction; and transmitting the second signal via the first cable comprises transmitting the second signal to the second network device via the first cable in an uplink direction.

Embodiment 30: The method of any of embodiments 24-28, wherein: receiving the first signal via the first cable comprises receiving the first signal from the second network device via the first cable in an uplink direction; and transmitting the second signal via the first cable comprises transmitting the second signal to the second network device via the first cable in a downlink direction.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory coupled to the processor, such as a RAM, a ROM, a flash memory, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A communication system for communicating via a plurality of cables, including a first cable and a second cable, the communication system comprising:
   a first receiver configured to receive a first Ethernet signal at a first baud rate via the first cable, the first baud rate conforming with a maximum bandwidth rating of the first cable;
   a first lowpass filter configured to filter the first Ethernet signal, the first lowpass filter having a cutoff frequency; and
   a first transmitter configured to transmit a second Ethernet signal at a second baud rate via the second cable concurrently with reception of the first Ethernet signal via the first cable, the second baud rate exceeding a maximum bandwidth rating of the second cable and the maximum bandwidth rating of the first cable, the second baud rate, which exceeds the maximum bandwidth rating of the second cable, being selected to mitigate degradation of the first Ethernet signal in the first cable, the degradation caused by transmission of the second Ethernet signal creating alien crosstalk in the first cable, by reducing power levels of the alien crosstalk at first frequencies below the cutoff frequency of the first lowpass filter as compared to power levels of the alien crosstalk at second frequencies above the cutoff frequency of the first lowpass filter.

2. The communication system of claim 1, further comprising:
   a second transmitter configured to transmit a third Ethernet signal at a third baud rate via the first cable concurrently with reception of the first Ethernet signal via the first cable; and
   a controller configured to, in response to determining that first data traffic being transmitted by a plurality of transmitters that includes the first transmitter and the second transmitter is heavier than second data traffic being received by a plurality of receivers that includes the first receiver:
      increase a transmission speed of the first transmitter from a fourth baud rate that conforms with the maximum bandwidth rating of the second cable to the second baud rate that exceeds the maximum bandwidth rating of the second cable, while maintaining a transmission speed of the first Ethernet signal at the first baud rate that conforms with the maximum bandwidth rating of the first cable.

3. The communication system of claim 1, further comprising:
   a second transmitter configured to transmit a third Ethernet signal at a third baud rate via the first cable concurrently with reception of the first Ethernet signal via the first cable;
   wherein the first receiver includes circuitry configured to process the first Ethernet signal to mitigate intra-cable crosstalk in the first Ethernet signal caused by the transmission of the third Ethernet signal in the first cable.

4. The communication system of claim 3, wherein the third baud rate is at least as high as the second baud rate.

5. The communication system of claim 3, further comprising:
   a second receiver configured to receive a fourth Ethernet signal via the second cable concurrently with i) reception of the first Ethernet signal via the first cable, ii) transmission of the second Ethernet signal via the second cable, and iii) transmission of the third Ethernet signal via the first cable, the fourth Ethernet signal having been transmitted at a fourth baud rate that is lower than both i) the first baud rate and ii) the third baud rate.

6. The communication system of claim 5, further comprising:
   a second lowpass filter configured to mitigate second alien crosstalk in the second cable caused by transmission of the third Ethernet signal in the first cable at the third baud rate.

7. The communication system of claim 1, wherein the first lowpass filter comprises an anti-aliasing analog lowpass filter.

8. The communication system of claim 1, wherein:
   the first transmitter is configured to transmit the second Ethernet signal at a baud rate of approximately 800 Megasymbols per second (MSps); and
   the first receiver is configured to receive the first Ethernet signal at a baud rate of at most approximately 400 MSps.

9. The communication system of claim 8, wherein:
   the first receiver is configured to receive the first Ethernet signal at a baud rate of approximately 125 MSps.

10. The communication system of claim 1, wherein:
    the first receiver is configured to receive the first Ethernet signal via the first cable in an uplink direction; and
    the first transmitter is configured to transmit the second Ethernet signal via the second cable in a downlink direction.

11. A method for communicating via a plurality of cables, including a first cable and a second cable, the method comprising:
    receiving, at a first receiver, a first Ethernet signal at a first baud rate via the first cable, the first baud rate conforming with a maximum bandwidth rating of the first cable;
    filtering the first Ethernet signal with a lowpass filter that has a cutoff frequency; and
    transmitting, by a first transmitter, a second Ethernet signal at a second baud rate via the second cable concurrently with reception of the first Ethernet signal via the first cable, the second baud rate exceeding a maximum bandwidth rating of the second cable and the maximum bandwidth rating of the first cable, the second baud rate, which exceeds the maximum bandwidth rating of the second cable, being selected to mitigate degradation of the first Ethernet signal in the first cable, the degradation caused by transmission of the second Ethernet signal creating alien crosstalk in the first cable, by reducing power levels of the alien crosstalk at first frequencies below the cutoff frequency of the first lowpass filter as compared to power levels of the alien crosstalk at second frequencies above the cutoff frequency of the first lowpass filter.

12. The method for communicating of claim 11, further comprising:
transmitting, by a second transmitter, a third Ethernet signal at a third baud rate via the first cable concurrently with reception of the first Ethernet signal via the first cable; and
in response to determining that first data traffic being transmitted by a plurality of transmitters that includes the first transmitter and the second transmitter is heavier than second data traffic being received by a plurality of receivers that includes the first receiver:
increasing, by a controller, a transmission speed of the first transmitter from a fourth baud rate that conforms with the maximum bandwidth rating of the second cable to the second baud rate that exceeds the maximum bandwidth rating of the second cable, while maintaining a transmission speed of the first Ethernet signal at the first baud rate that conforms with the maximum bandwidth rating of the first cable.

13. The method for communicating of claim 11, further comprising:
transmitting, by a second transmitter, a third Ethernet signal at a third baud rate via the first cable concurrently with reception of the first Ethernet signal via the first cable; and
processing, by the first receiver, the first Ethernet signal to mitigate intra-cable crosstalk in the first Ethernet signal caused by the transmission of the third Ethernet signal in the first cable.

14. The method for communicating of claim 13, wherein the third baud rate is at least as high as the second baud rate.

15. The method for communicating of claim 13, further comprising:
receiving, at a second receiver, a fourth Ethernet signal via the second cable concurrently with i) reception of the first Ethernet signal via the first cable, ii) transmission of the second Ethernet signal via the second cable, and iii) transmission of the third Ethernet signal via the first cable, the fourth Ethernet signal having been transmitted at a fourth baud rate that is lower than both i) the first baud rate and ii) the third baud rate.

16. The method for communicating of claim 15, further comprising:
filtering, by a second lowpass filter, the fourth Ethernet signal to mitigate second alien crosstalk in the second cable caused by transmission of the third Ethernet signal in the first cable at the third baud rate.

17. The method for communicating of claim 11, wherein filtering the first Ethernet signal with the lowpass filter comprises:
filtering the first Ethernet signal with anti-aliasing analog lowpass filter.

18. The method for communicating of claim 11, wherein:
transmitting the second Ethernet signal comprises transmitting the second Ethernet signal at a baud rate of approximately 800 Megasymbols per second (MSps); and
receiving the first Ethernet signal comprises receiving the first Ethernet signal at a baud rate of at most approximately 400 MSps.

19. The method for communicating of claim 18, wherein:
receiving the first Ethernet signal comprises receiving the first Ethernet signal at a baud rate of approximately 125 MSps.

20. The method for communicating of claim 11, wherein:
receiving the first Ethernet signal comprises receiving the first Ethernet signal via the first cable in an uplink direction; and
transmitting the second Ethernet signal comprises transmitting the second Ethernet signal via the second cable in a downlink direction.

* * * * *